United States Patent
Oren et al.

(10) Patent No.: US 8,861,516 B2
(45) Date of Patent: *Oct. 14, 2014

(54) METHOD AND SYSTEM FOR TRANSFORMING COMPRESSED VIDEO TRAFFIC TO NETWORK-AWARE ETHERNET TRAFFIC WITH A/V BRIDGING CAPABILITIES AND A/V BRIDGING EXTENSIONS

(75) Inventors: Amit Oren, Los Altos, CA (US); Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/860,264

(22) Filed: Sep. 24, 2007

(65) Prior Publication Data

US 2008/0285568 A1 Nov. 20, 2008

Related U.S. Application Data

(60) Provisional application No. 60/917,870, filed on May 14, 2007.

(51) Int. Cl.
*H04L 12/28* (2006.01)
*H04N 21/643* (2011.01)

(52) U.S. Cl.
CPC .. *H04N 21/64322* (2013.01); *H04L 2012/2849* (2013.01); *H04L 12/2816* (2013.01); *H04L 12/2805* (2013.01)
USPC .......................................... 370/389; 710/316

(58) Field of Classification Search
USPC ................. 370/389, 392, 473, 466, 401, 394; 710/62; 375/240.01, 240.12; 348/739
See application file for complete search history.

(56) References Cited

U.S. PATENT DOCUMENTS

| | | | |
|---|---|---|---|
| 5,909,564 A | 6/1999 | Alexander et al. | |
| 6,650,640 B1 * | 11/2003 | Muller et al. | 370/392 |
| 7,107,380 B1 | 9/2006 | Mohan | |
| 7,430,681 B1 | 9/2008 | Hobbs | |
| 2002/0015409 A1 | 2/2002 | Gao et al. | |
| 2002/0034182 A1 * | 3/2002 | Mallory | 370/394 |

(Continued)

OTHER PUBLICATIONS

Michael D. Johas Teener, "Audio/Video Bridging for Home Networks (IEEE 802.1 AV Bridging Task Group)," Joint ITU-T/IEEE Workshop on Carrier-class Ethernet, XP002509617, May 31-Jun. 1, 2007, pp. 1-35, Geneva.

*Primary Examiner* — Wei Zhao
*Assistant Examiner* — Lionel Preval
(74) *Attorney, Agent, or Firm* — Oblon, Spivak, McClelland, Maier & Neustadt, L.L.P.

(57) ABSTRACT

Aspects of a system for transforming compressed video traffic to network-aware Ethernet traffic with A/V bridging capabilities and A/V bridging extensions may include a graphics processing unit (GPU) that may enable encapsulation of compressed video data within a Display Port protocol data unit (PDU). A LAN subsystem may enable encapsulation of the Display Port PDU within an encapsulating PDU. The LAN subsystem may enable determination of a traffic class designation associated with the encapsulating PDU. The LAN subsystem may enable transmission of the encapsulating PDU via a network based on the traffic class designation. The LAN subsystem may also enable the encapsulation of compressed video data within Ethernet frames. A computing device, which receives the Ethernet frames may de-compress the compressed video data and send the uncompressed video data, which may be encapsulated within one or more Display Port mini-packets, to a multimedia monitor.

29 Claims, 13 Drawing Sheets

(56) References Cited

U.S. PATENT DOCUMENTS

| | | |
|---|---|---|
| 2002/0181486 A1 | 12/2002 | Cantwell |
| 2004/0047353 A1 | 3/2004 | Umayabashi et al. |
| 2004/0179521 A1 | 9/2004 | Kim et al. |
| 2004/0221163 A1 | 11/2004 | Jorgensen et al. |
| 2005/0204027 A1 | 9/2005 | Claseman |
| 2005/0204207 A1 | 9/2005 | Arai et al. |
| 2006/0018328 A1 | 1/2006 | Mody et al. |
| 2006/0143335 A1 | 6/2006 | Ramamoorthy et al. |
| 2006/0230146 A1 | 10/2006 | Wang et al. |
| 2007/0061414 A1 | 3/2007 | Bakke |
| 2008/0052426 A1* | 2/2008 | Montag ............................ 710/62 |
| 2008/0101409 A1* | 5/2008 | West et al. ..................... 370/473 |
| 2008/0101770 A1* | 5/2008 | Commons et al. ............. 386/124 |
| 2008/0159304 A1* | 7/2008 | Ozugur et al. ................. 370/401 |
| 2008/0187028 A1 | 8/2008 | Lida |
| 2008/0205519 A1* | 8/2008 | Goodart et al. ........... 375/240.12 |
| 2008/0240152 A1* | 10/2008 | Quinn et al. ................... 370/466 |
| 2008/0279186 A1* | 11/2008 | Winter et al. .................. 370/392 |
| 2008/0284621 A1 | 11/2008 | Diab et al. |
| 2008/0285444 A1 | 11/2008 | Diab et al. |
| 2008/0285572 A1 | 11/2008 | Diab |
| 2008/0285576 A1 | 11/2008 | Teener et al. |
| 2008/0285643 A1 | 11/2008 | Diab |
| 2008/0288704 A1 | 11/2008 | Diab et al. |
| 2008/0288987 A1 | 11/2008 | Teener et al. |
| 2009/0116547 A1* | 5/2009 | Lida et al. ................. 375/240.01 |
| 2009/0141186 A1* | 6/2009 | Guo et al. ...................... 348/739 |

* cited by examiner

METHOD AND SYSTEM FOR TRANSFORMING COMPRESSED VIDEO TRAFFIC TO NETWORK-AWARE ETHERNET TRAFFIC WITH A/V BRIDGING CAPABILITIES AND A/V BRIDGING EXTENSIONS

CROSS-REFERENCE TO RELATED APPLICATIONS/INCORPORATION BY REFERENCE

This application makes reference to, claims priority to, and claims the benefit of U.S. Provisional Application Ser. No. 60/917,870, filed on May 14, 2007, which is hereby incorporated herein by reference in its entirety.

FIELD OF THE INVENTION

Certain embodiments of the invention relate to communication networks. More specifically, certain embodiments of the invention relate to a method and system for transforming compressed video traffic to network-aware Ethernet traffic with A/V bridging capabilities and A/V bridging extensions.

BACKGROUND OF THE INVENTION

The generation and rendering of high end graphics often involves the movement of large quantities of data. Frequently the data is stored in a server, from which it may be accessed by users at computer workstations (or, more generally, at computing devices) via a network. Once the data is received at the computing device, the graphics may be displayed on an attached video monitor. In many cases the video monitor is physically separate and has been conventionally attached to the computing device via an analog interface, such as a video graphics array (VGA) interface, or a digital interface such as a digital visual interface (DVI). In a typical configuration, an interface in the computing device is connected to a compatible interface in the video monitor via an interstitial connector, such as a cable.

In an alternative configuration, the computing device may incorporate a video monitor. An example of this configuration is a laptop computer in which the video monitor is a component in the physical computing device unit. Whether the video monitor is physically incorporated within the computing device or is a physically separate device, the video monitor may or may not have touch screen capability.

Display Port is a digital interface standard, which enables a computing device to send graphics and video data to a video monitor, or multimedia display device, via a Display Port interface. In this regard, the Display Port interface standard may describe a point-to-point interface, which is capable of transmitting data from a device connected at one end of a connecting cable to a device connected at the other end of the connecting cable. The graphics and/or video data communicated across the Display Port interface may be sent in mini-packets as described in applicable standards. The mini-packets may contain information comprising instructions on how to render the graphics and/or video data on the video display screen, for example. The mini-packets may be sent via a plurality of data paths referred to as "lanes". In an exemplary Display Port interface, there may be four (4) such lanes.

In addition to supporting unidirectional data traffic from the computing device to the computer monitor (or other attached video display device), the Display Port standard may also enable the bidirectional transfer of data. For example, the Display Port standard may allow for the exchange of encryption keys to enable the transfer of encrypted digital data across the Display Port interface. This capability may enable protection of digital content transferred across the Display Port interface.

Digital video may require high data rates. The data rate for digital video may be determined based on the number of bits utilized to display each picture element (pixel) in an image frame (frame), the number of pixels in a frame, the number of frames displayed per second. For example, transmission of a progressively scanned 1920×1080 pixel high definition television (HDTV) 24-bit color image at a frame rate of 30 frames/s may require a data rate in excess of 1 billion bits/s.

Many video applications utilize compressed data. Data compression enables a reduction in the quantity of data utilized to represent video images. The data may be compressed at the source end (for example a system, which may generate video data or retrieve video data) and decompressed at the destination end (for example a system, which may enable the display and/or rendering of video data). Exemplary data compression methods utilized for video compression include run length encoding (RLE) and discrete cosine transform (DCT). Standards which utilize video compression include MPEG-1, MPEG-2, MPEG-4, H.261, H.262, H.263 and H.264. Other methods for data compression include Huffman coding, Shannon-Fano coding and Fibonacci coding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for transforming compressed video traffic to network-aware Ethernet traffic with A/V bridging capabilities and A/V bridging extensions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
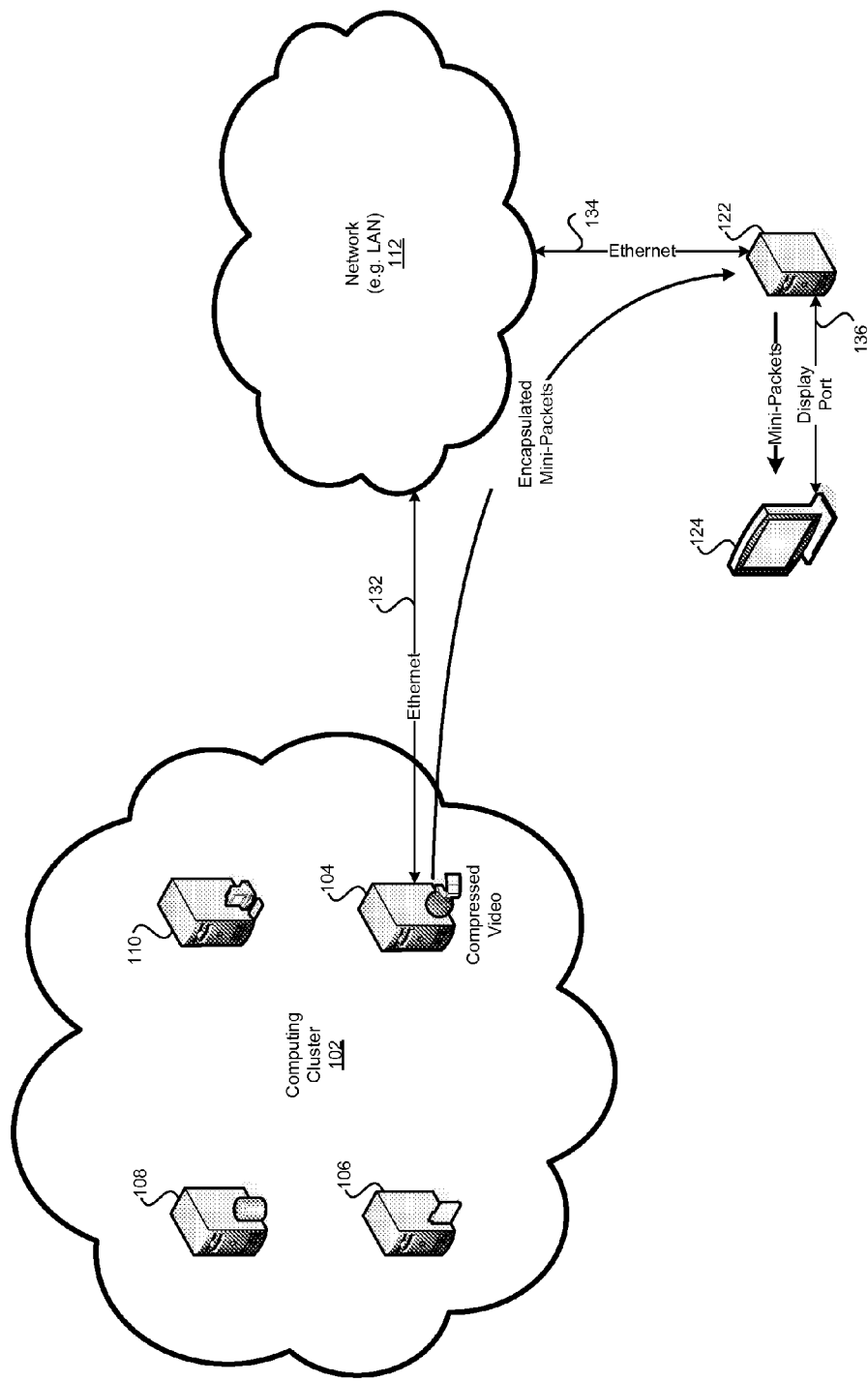
FIG. 1 is a diagram illustrating an exemplary system for transfer of Display Port data across a network, in accordance with an embodiment of the invention.

Certain embodiments of the invention may be found in a method and system for transforming compressed video traffic to network-aware Ethernet traffic with A/V bridging capabilities and A/V bridging extensions. Various embodiments of the invention may comprise a method for extending the point-to-point limitation of conventional Display Port data transfers, to enable transfer of Display Port data across a network, such as a local area network (LAN). In this regard, a computer graphics server located in a computing cluster may be able to transfer Display Port data across a network, to a Display Port interface located within a destination computer workstation, desktop computer, laptop computer or other computing device. The Display Port interface within the destination computing device may then transfer the received Display Port data to an attached multimedia display device via a point-to-point connection between the destination computing device and the attached multimedia display device. The Display Port mini-packets may comprise video data, which is compressed at the server, utilizing a method for data and/or video compression, and decompressed at the multimedia display device.

In the exemplary embodiment of the invention described above, the computer graphics server may generate Display Port mini-packets, which comprise rendering instructions for the display of video data. The mini-packet may also be referred to as a Display Port protocol data unit (PDU). One or more Display Port mini-packets may comprise video data, which are compressed utilizing data and/or video compression methods. The mini-packets may be encapsulated in one or more Ethernet packets and transported across the network to the destination computing device. At the destination computing device, the Display Port mini-packets may be de-encapsulated and sent to the Display Port interface located within the destination computing device. The mini-packets may then be sent to the Display Port interface located within the attached multimedia display device, where the video data may decompressed. The decompressed video data may be rendered for display.

In various embodiments of the invention, a plurality of multimedia displays may be coupled to the destination computing device. In this aspect of the invention, the display port mini-packets may be sent to one or more of the attached multimedia monitors. In addition to enabling the extension of Display Port transfers, various embodiments of the invention enable the destination computing device to have "thin client" capabilities. In this regard, various embodiments of the invention may support high performance graphics within low-cost destination computing devices without requiring costly high performance graphics processing hardware and/or software. Various embodiments of the invention may be practiced with a computer workstation, a desktop computer, a laptop computer or other computing device.

Various embodiments of the invention may be utilized in digital video applications, which utilize video compression such as MPEG, JPEG, H.261, H.262, H.263 and/or H.264, for example. Various embodiments of the invention may also be utilized in application, which utilize data compression in general, such as Huffman coding, Shannon-Fano coding and/or Fibonacci coding, for example.

FIG. 1 is a diagram illustrating an exemplary system for transfer of Display Port data across a network, in accordance with an embodiment of the invention. Referring to FIG. 1, there is shown a computing cluster 102, a network 112, a computing device 122 and a multimedia monitor 124. The computing cluster 102 may comprise a video server 104, a file server 106, a database server 108 and a network management server 110.

The computing cluster 102 may comprise a plurality of servers, each of which may perform one or more specific tasks, or execute one or more specific applications. Each server may store data which may be accessible to users at computing devices 122, which are attached to the network 112. The servers within the computer cluster 102 may communicate with each other, and/or with the network 112 via Ethernet interfaces. The video server 104 may store computer graphics data in addition to storing video, audio and/or multimedia programs. The multimedia monitor 124 may enable the rendering and display of visual images comprising video and/or graphics, for example.

The video server 104 may comprise hardware and/or software, which enables processing of graphics, video, audio and/or multimedia data. The computer graphics, video, audio and/or multimedia stored at the video server 104 may be accessible via the network 112. The file server 106 may store one or more files. The file server 106 may be utilized, for example, to store files from various users. The database server 108 may store one or more database programs, applications and/or files. The network management server 110 may store information pertaining to the configuration and/or availability of various network communications devices and/or interfaces. The network management server 110 may utilize a protocol such as the simple network management protocol (SNMP). The computing device 122 and multimedia monitor 124 may communicate via Display Port interfaces. The computing device 122 may communicate with the network 112 via an Ethernet interface.

In an exemplary mode of operation, the video server 104 may encapsulate the video data in one or more Display Port mini-packets. The video data may be compressed. In turn, the video server 104 may encapsulate the one or more Display Port mini-packets in one or more Ethernet frames. Alternatively, the video server 104 may directly encapsulate the compressed video data in one or more Ethernet frames. The format of the Ethernet frames may be specified in applicable standards documents, such as IEEE 802 standards. The Ethernet frames may contain an address (for example, in a destination address field within the Ethernet frames), which indicates that the Ethernet frames are to be transported across the network 112, and delivered to the computing device 122. The Ethernet frames may comprise a designation (for example, in an EtherType field of the Ethernet frames), which indicates that the Ethernet frames are being utilized to encapsulate Display Port mini-packets. The Ethernet frames may also comprise a traffic class identifier, which may enable the network 112 to provide services in accordance with AV Bridging specifications. These services may comprise prioritized transport of the Ethernet frames across the network 112 to enable the time duration for transport across the network 112 to meet latency targets associated with the specified traffic class.

In an exemplary embodiment of the invention, the video server 104 may compress at least a portion of the video data. The compressed portion (or the entire block) of the video data may then be encapsulated in one or more Display Port mini-packets. The one or more Display Port mini-packets may then be encapsulated in one or more Ethernet frames.

The video server 104 may transport the Ethernet frames via an Ethernet interface connector 132 to the network 112. The Ethernet frames may subsequently be transported from the network 112 to the computing device 122 via an Ethernet interface connector 134. An exemplary Ethernet interface connector may be a category 5 cable.

Upon receipt of the Ethernet frames, the computing device 122 may determine (for example, based on an identifier in the EtherType field of the received Ethernet frames) that the received Ethernet frames contain Display Port mini-packets. The computing device 122 may de-encapsulate the Display Port mini-packets. The computing device 122 may subsequently send the de-encapsulated Display Port mini-packets to the multimedia monitor 124 via the Display Port interface connector 136. The Display Port interface connector 136 may enable physical connection between the computing device and the multimedia monitor 124 via a point-to-point connection. The compressed video contained within the Display Port mini-packets may be decompressed. The decompressed video may then be rendered for display at the multimedia monitor 124.

In various embodiments of the invention, point-to-point oriented traffic, which contains no destination identification information (such as a destination address, for example) may be encapsulated in Ethernet packets at a centralized server (such as a video server 104), and transported across a network 112 (such as a LAN, for example). The point-to-point oriented traffic may comprise Display Port mini-packets, or compressed video (including high definition video) data generated by an application program, for example. The encapsulated traffic may be de-encapsulated at a network destination device (such as the computing device 122) and delivered to a destination multimedia device (such as the multimedia monitor 124). Thus, in various embodiments of the invention, from the perspective of the application(s), which enable the generation of the point-to-point oriented traffic, the centralized server (such as the video server 104) may transport the point-to-point oriented traffic across a network 112 to the destination multimedia device 124 as though the destination multimedia device 124 were directly attached to the centralized server via an interface, which is suitable for transport of the point-to-point oriented traffic. In an exemplary embodiment of the invention, the interface may be a Display Port interface, when the Ethernet frames encapsulate Display Port mini-packets. In another exemplary embodiment of the invention, the interface may be a DVI, when the Ethernet frames encapsulate compressed video data suitable for transport via a DVI.

In various embodiments of the invention, the tasks performed by the computing device 122 may comprise reception of Ethernet frames via the Ethernet interface connector 134, determination that the Ethernet frames may contain encapsulated Display Port mini-packets, de-encapsulation of the Display Port mini-packets, and transfer of the de-capsulated Display Port mini-packets to the multimedia monitor 124 via the Display Port interface connector 136. In this regard, the video server 104 may generate instructions for rendering the video data on the multimedia monitor 124 within the Display Port mini-packets instead of requiring that this task be performed within the computing device 122. Thus, various embodiments of the invention may enable the computing device 122 to be a "thin client" device, which may not require high performance hardware and/or software capabilities to enable the generation of Display Port mini-packets for high performance video and/or graphics applications. This in turn may enable the rendering of high performance video and/or graphics on multimedia monitors 124 which are attached to low cost computing devices 122. Prior to the reception of the Ethernet frames, the computing device 122 may send a request to the video server 104. The video server 104 may respond to the request by sending the video data to the computing device 122 via the network 112.

Figure 2:
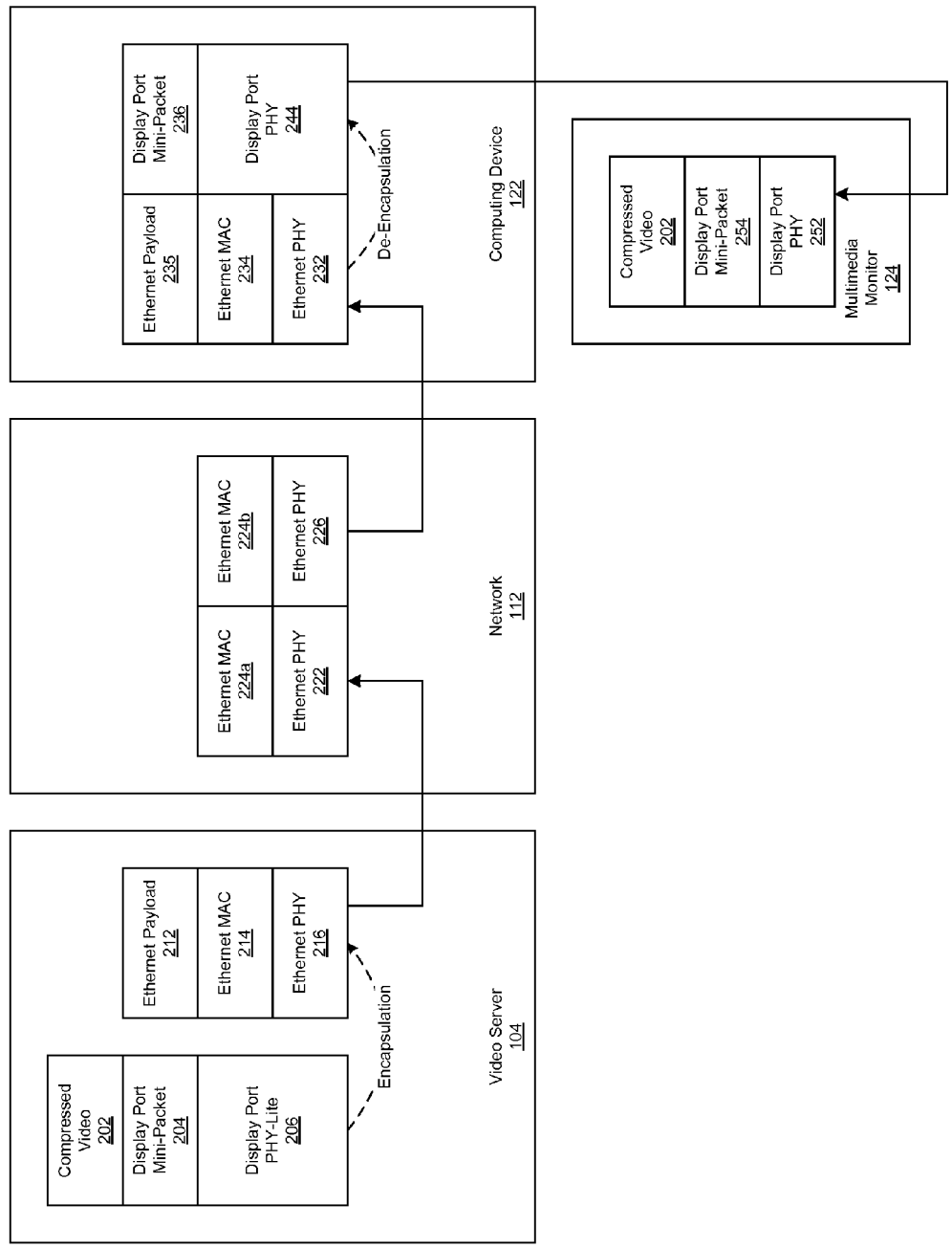
FIG. 2 is a diagram illustrating exemplary bridging of Display Port traffic over Ethernet, in accordance with an embodiment of the invention.

FIG. 2 is a diagram illustrating exemplary bridging of Display Port traffic over Ethernet, in accordance with an embodiment of the invention. Referring to FIG. 2, there is shown the video server 104 (FIG. 1), the network 112, the computing device 122 and the multimedia monitor 124. The video server 104 may comprise compressed video 202 and a plurality of protocol layers. The protocol layers may comprise a Display Port mini-packet layer 204, an Ethernet payload layer 212, a Display Port light physical (PHY-Lite) layer 206, an Ethernet medium access control (MAC) layer 214 and an Ethernet physical (PHY) layer 216. The network 112 may comprise one or more switching devices which comprise at least one Ethernet PHY layer 222 and 226 and at least one Ethernet MAC layer 224a and 224b. The computing device 122 may comprise a plurality of protocol layers including an Ethernet payload layer 235, a Display Port Mini-Packet layer 236, an Ethernet MAC layer 234, an Ethernet PHY layer 232 and a Display Port PHY layer 244. The multimedia monitor 124 may comprise protocol layers related to the compressed video 202 and to a plurality of protocol layers including a Display Port PHY layer 252 and a Display Port mini-packet layer 254. The Display Port PHY layer 244 may comprise suitable logic, circuitry and/or code that may enable generation of electrical and/or optical signals for transport via the Display Port interface connector 136. The Display Port PHY-Lite layer 206 may comprise logic, circuitry and/or code, which may enable generation of electrical and/or optical signals suitable for transport within the video server 104. However, the generated signals may not be suitable for transport of signals via an external interface.

In various embodiments of the invention, the compressed video 202 may be generated by an application, which may be executing within the video server 104. The compressed video 202 may then be encapsulated in Display Port mini-packets in the Display Port mini-packet layer 204. The Display Port mini-packets may also contain instructions to enable rendering of the compressed video 202 on the multimedia monitor 124. A Graphics Processing Unit (GPU) may generate the Display Port mini-packets. The Display Port PHY-Lite layer 206 may enable reception of the Display Port mini-packets and generation of the line coded bits at a LAN subsystem within the video server 104. The line coded bits may be decoded and reassembled to form Ethernet payload(s). The Ethernet payload layer 212 may subsequently send the Ethernet payload(s) to the Ethernet MAC layer 214. The Ethernet MAC layer 214 may encapsulate the received Ethernet payload(s) in one or more Ethernet frames. The Ethernet frames may comprise information, which indicates that the Ethernet frames contain one or more encapsulated Display Port mini-packets and/or traffic class identification, for example. The Ethernet MAC layer 214 may send the Ethernet frames to the Ethernet PHY layer 216, which may enable transport of the Ethernet frames to the network 112 via the Ethernet interface connector 132. The traffic class identification may enable the utilization of AV Bridging services for the transport of the Ethernet frames within the network 112.

Within the network 112, the Ethernet PHY layer 222 within a switching device (such as an Ethernet switch) may receive the Ethernet frames via the Ethernet interface connector 132. One or more of the switching devices within the network 112 may support AV Bridging services. The Ethernet MAC layer 224*a* may enable the switching device to determine (based on the destination address field within the Ethernet frames, for example) that the computing device 122 is the destination device for receipt of the Ethernet frames. The Ethernet MAC layer 224*b* may send the Ethernet frames to the Ethernet PHY layer 226, which may enable transport of the Ethernet frames to the computing device 122 via the Ethernet interface connector 134.

Within the computing device 122, the Ethernet PHY layer 232 may receive the Ethernet frames via the Ethernet interface connector 134, which may be subsequently sent to the Ethernet MAC and MAC services layer 234. The Ethernet MAC and MAC services layer 234 may determine that the received Ethernet frames contain encapsulated Display Port mini-packets. The Ethernet MAC and MAC services layer 234 may de-encapsulate the Ethernet payloads from the received Ethernet frames. The Ethernet payload layer 235 may receive the Ethernet payload and generate one or more Display Port mini-packets. The Display Port mini-packets may then be sent to the Display Port mini-packet layer 236. The Display Port mini-packet layer 236 may determine that the received Display Port mini-packets are to be sent to the multimedia monitor 124. The Display Port mini-packet layer may send the Display Port mini-packets to the Display Port PHY layer 244, which may subsequently transmit the Display Port mini-packets to the multimedia monitor 124 via the Display Port interface connector 136.

Within the multimedia monitor 124, the Display Port PHY layer 252 may receive the Display Port mini-packets via the Display Port interface connector 136. The Display Port PHY layer 252 may send the received Display Port mini-packets to the Display Port mini-packet layer 254. The Display Port mini-packet layer 254 may extract the compressed video 202 from the received Display Port mini-packets. The compressed video 202 may be decompressed to generate uncompressed video. The Display Port mini-packet layer 254 may also extract instructions contained within the Display Port mini-packets, which enable rendering of the uncompressed video 202 at the multimedia monitor 124. The multimedia monitor 124 may then utilize the extracted instructions to display the uncompressed video 202.

As shown in FIG. 2, in various embodiments of the invention, the video server 104 and the multimedia monitor 124 may process compressed video, while the computing device 122 may not or may be limited in performance. Thus, in various embodiments of the invention, the computing device 122 may be a low cost appliance, which may not be required to comprise costly hardware and/or software to enable processing and/or rendering of high performance multimedia, video and/or graphics.

Various embodiments of the invention may not be limited to the transfer of Display Port mini-packets across a LAN. For example, in various embodiments of the invention, the Display Port mini-packets may be encapsulated within any of a variety of protocol data units (PDU) associated with higher layer protocols, for example a network layer protocol. An exemplary network layer protocol may be defined as set forth in a relevant protocol reference model (PRM), for example as specified by a standards organization such as the International Organization for Standardization (ISO).

In an exemplary embodiment of the invention, which utilizes a network layer protocol, Display Port mini-packets may be encapsulated within IP (Internet Protocol) packets. The IP packets may subsequently be encapsulated within Ethernet frames. Encapsulation of the Display Port mini-packets within IP packets may enable the transport of the encapsulated Display Port mini-packets across a network, such as the Internet. The transport of encapsulated Display Port mini-packets within IP packets may also utilize protocols such as the Reservation Protocol (RSVP), as defined by the Internet Engineering Task Force (IETF), for example. The services provided by RSVP may be coordinated with AV Bridging services to support isochronous and/or real-time transmission of IP packets, which contain encapsulated Display Port mini-packets. In this regard, quality of service (QoS) aspects of RSVP (or similar higher layer protocol) may be mapped to the physical layer via AV Bridging to enable the transport of the encapsulated Display Port mini-packets across a network based on suitable bandwidth and latency targets.

Within the context of the ISO PRM, Ethernet functions related to medium access control (MAC) may be associated with the data link layer (DLL), while Ethernet functions related to line coding of data and generation of signals for transmission of bits via a physical medium may be associated with the physical layer (PHY). IP related functions may be associated with the network layer. At least a portion of a PDU for a given protocol layer may be encapsulated as a service data unit (SDU) within the PDU for the next lower protocol layer.

Figure 3:
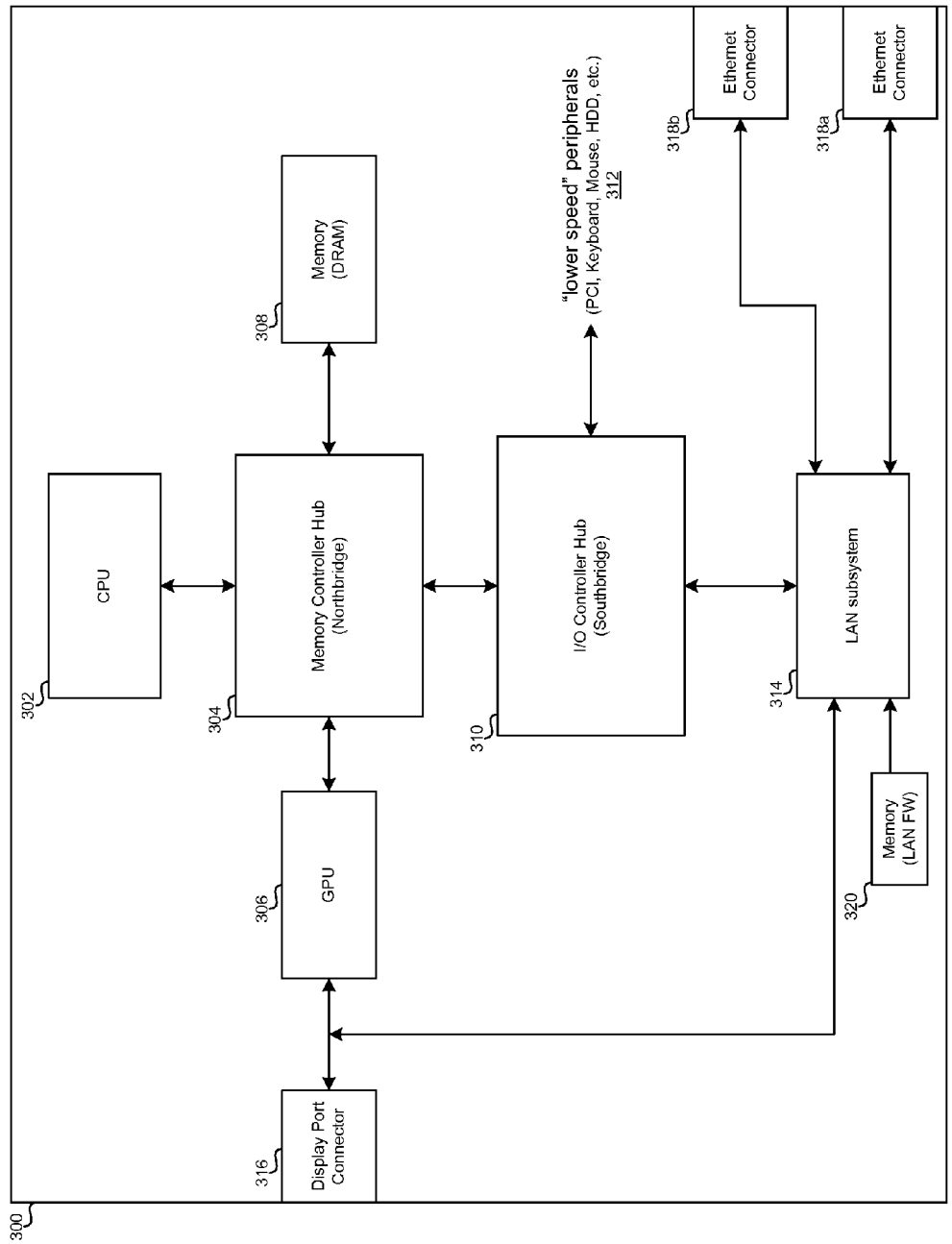
FIG. 3 is a diagram illustrating an exemplary system enabled to transmit and/or receive Display Port and/or Ethernet data streams, in accordance with an embodiment of the invention.

FIG. 3 is a diagram illustrating an exemplary system enabled to transmit and/or receive Display Port and/or Ethernet data streams, in accordance with an embodiment of the invention. Referring to FIG. 3 the system 300 may comprise a CPU 302, a memory controller hub (MCH) 304, a graphics processing unit (GPU) 306, a memory block 308, an input/output controller hub (ICH) 310, a low speed peripheral block 312, a LAN subsystem 314, a DP connector 316, an Ethernet connector 318*a*, an Ethernet connector 318*b* and memory 320.

The CPU 302 may comprise suitable logic, circuitry, and/or code that may enable processing data and/or controlling operations of the system 300. In this regard, the CPU 302 may be enabled to provide control signals to the various other blocks comprising the system 300. The CPU 302 may also enable execution of applications programs and/or code. The applications programs and/or code may enable generation of compressed video and/or graphics. The CPU 302 may also enable the retrieval of stored compressed video and/or graphics. The CPU 302 may be accessed via the MCH 304.

The MCH 304 may comprise suitable logic, circuitry, and/or code that may enable the storage and/or retrieval of data at high data transfer rates. For example, the MCH 304 may enable retrieval and/or storage of compressed video and/or graphics data for high performance applications, such as high definition video, high resolution 3-D graphics, &c. In various embodiments of the invention, the MCH 304 may be referred to as a northbridge (NB).

The GPU 306 may comprise suitable logic, circuitry, and/or code for generating, rendering, and/or manipulating graphics data. The GPU 306 may output compressed video and/or graphics. The GPU 306 may also output encrypted compressed video and/or graphics for applications that utilize digital content protection, for example. The GPU 306 may encapsulate the compressed video and/or graphics in Display Port mini-packets. The Display Port mini-packets generated by the GPU 306 may also comprise instructions, which enable rendering of the compressed video and/or graphics for display on a multimedia monitor 124 (FIG. 1). The GPU 306 may also output protocol data units associated with other high definition (HD) protocols. The GPU 306 may comprise Display Port PHY layer functionality, which enables the GPU 306 to send and/or receive Display Port mini-packets via the Display Port connector 316.

The memory 308 may comprise suitable logic, circuitry, and/or code that may enable the storage and/or retrieval of data. For example, the memory 308 may enable the storage and/or retrieval of compressed video and/or graphics data. The memory 308 may also enable the storage and/or retrieval of encryption keys, which may be utilized for encryption and/or decryption of data. The memory 308 may additionally store data, for example, configuration data and/or state variables utilized in controlling/configuring the various blocks of the system 300. The memory 308 may also enable the storage of code, which enables the execution of multimedia applications, for example. The memory 308 may utilize various technologies, such as dynamic random access memory (DRAM), which enable data to be stored and/or retrieved at sufficiently high data rates to enable high performance multimedia applications, for example.

The ICH 310 may comprise suitable logic, circuitry, and/or code that may enable the storage and/or retrieval of data from peripheral devices such as hard disk drives. The ICH 310 may also enable the retrieval of input signals and/or interrupt signals from peripheral devices, such as keyboard device and mouse devices, and/or other peripheral devices including various peripheral component interconnect (PCI) devices, for example. In various embodiments of the invention, the ICH 310 may be referred to as a southbridge (SB).

The LAN subsystem 314 may comprise suitable logic, circuitry, and/or code to enable the transmission and/or reception of Ethernet frames. The LAN subsystem 314 may comprise PHY layer functions and MAC layer functions. The LAN subsystem 314 may enable transmission and/or reception of Ethernet frames at various transfer rates, such as 10 Mbps, 100 Mbps, 1,000 Mbps (or 1 Gbps) and/or 10 Gbps, or other rates (for example, higher rates). The LAN subsystem 314 may also enable transmission and/or reception of Ethernet frames via wireless LANs (WLAN).

The PHY layer functions may enable transmission of Ethernet frames via a communication medium. The PHY layer functions may also enable reception of Ethernet frames via the communication medium. The PHY layer functions may generate signals for transmission that are suitable for the physical medium being utilized for transmitting the signals. For example, for an optical communication medium, the PHY layer may generate optical signals, such as light pulses, or for a wired communication medium, the PHY layer may generate electromagnetic signals.

The MAC layer functions may enable orderly communication between systems that are communicatively coupled via a shared communication medium. The MAC layer may comprise one or more coordination functions (CF) that enable a system to determine when it may attempt to access the shared communication medium. For example, in a wired communication medium, for example Ethernet, a CF may utilize a carrier sense multiple access with collision detection (CSMA/CD) algorithm. The MAC layer functions may implement mechanisms for scanning the communication medium to determine when it is available for transmission of signals. The MAC layer functions may comprise back off timer mechanisms, which may be utilized by a system to determine how often to attempt to access a communication medium, which is currently determined to be unavailable.

The MAC layer functions may also enable AV Bridging capabilities. In this regard, the MAC layer functions may determine a traffic class which is associated with transmitted Ethernet frames. Based on the determined traffic class, the MAC layer functions may perform traffic shaping by determining a time instant at which an Ethernet frame may be sent to the network via the Ethernet interface. That time instant may be determined based on a time instant at which one or more preceding Ethernet frames were also transmitted via the Ethernet interface. The time instant may also be determined based on stored "credits", which may indicate a quantity of octets of Ethernet frame data that may be transmitted at "line rate" before transmission of subsequent Ethernet frames is suspended pending the accumulation of additional credits.

The MAC layer functions, which support AV Bridging, may also enable the end-to-end transport of Ethernet frames based on specified latency targets by initiating admission control procedures. The latency targets, which may specify a maximum time duration for the transport of Ethernet frame across the network, may be determined based on a specified traffic class. A destination Ethernet device may initiate admission control procedures by initiating a registration request across the network to the source Ethernet device. A successful registration may enable the network to reserve resources for the transport of Ethernet frames between the source Ethernet device and the destination Ethernet device, in accordance with the specified latency targets.

The Ethernet MAC layer functions may also enable an exchange of timing synchronization information between communicating Ethernet devices. Individual Ethernet MAC layer functions associated with each of a plurality of Ethernet devices within a LAN may exchange timing synchronization with the Ethernet MAC layer function associated with a specified Ethernet device associated with the LAN, wherein the specified Ethernet device may provide system timing for the plurality of Ethernet devices associated with the LAN. The traffic shaping and/or timing synchronization capabilities may enable AV Bridging services to support isochronous and/or real time services, such as streaming media services.

In various embodiments of the invention, the MAC layer functions within the LAN subsystem 314 may enable the reception of Display Port mini-packets and encapsulation of the received Display Port mini-packets within Ethernet frames. The Ethernet frames may utilize AV Bridging services when being transmitted via the network 112. The MAC layer functions within the LAN subsystem 314 may also enable the reception of Ethernet frames and the de-encapsulation of Display Port mini-packets from Ethernet frames, which are determined to contain encapsulated Display Port mini-packets.

In various embodiments of the invention, the LAN subsystem 314 may utilize code, such as firmware, and/or data stored within the memory 320 to enable the operation of MAC layer functions and/or PHY layer functions within an Ethernet LAN, for example. The firmware may also enable encapsulation of Display Port mini-packets and/or compressed video and/or graphics in Ethernet frames within the LAN subsystem 314. In addition, the firmware may enable de-encapsulation of Display Port mini-packets and/or compressed video and/or graphics from Ethernet frames.

The Display Port connector 316 may enable physical connection of a Display Port interface connector 136 to the system 300. The physical connection may comprise at least conductors for each of the 4 lanes in the Display Port interface and for an auxiliary (AUX) channel. The 4 lanes may enable the transmission or reception of Display Port mini-packets, while the AUX channel may enable transmission and reception of control signals, input from peripheral devices, such as keyboards and/or mouse device, and for the exchange of encryption keys.

The Ethernet connector 318a may enable physical connection of an Ethernet interface connector 132 to the system 300. The Ethernet connector 318a may enable physical connection via an 8P8C connector and/or via in RJ45 connector, for example. The Ethernet connector 318b may be substantially similar to the Ethernet connector 318a.

Various embodiments of the invention may enable the decompression of compressed video 202 to generate uncompressed video. The uncompressed video may be rendered on a multimedia monitor 124, which has a direct physical connection to the system 300 via a Display Port interface connector 136 without requiring that the system 300 comprise compressed video and/or graphics processing capabilities. In an exemplary embodiment of the invention, the system 300 may comprise a computing device 122. In operation, the system 300 may receive Ethernet frames via the Ethernet connector 318a. The LAN subsystem 314 within the computing device 122 may receive the Ethernet frames and determine that the received Ethernet frames contain encapsulated Display Port mini-packets. The LAN subsystem 314 may de-encapsulate the Display Port mini-packets. The LAN subsystem may utilize Display Port PHY layer 244 functionality to transmit the de-encapsulated Display Port mini-packets to a multimedia monitor 124 (FIG. 1) via the Display Port connector 316. The multimedia monitor 124 may render compressed video 202 contained within the Display Port mini-packets for visual display.

The system 300 may utilize the AUX channel to transmit data signals. In an exemplary embodiment of the invention, a computing device 122 may send station identification information to the video server 104 via the AUX channel. The ability to send station identification information, for example, may enable the computing device 122 to be utilized in universal plug and play (UPnP) networks. The CPU 302 may generate the station identification information, which may be sent to the GPU 306 via the MCH 304. The GPU 306 may send the station identification information via the AUX channel instead.

Various embodiments of the invention may also enable the transmission of conventional Ethernet frames. The ICH 310 may receive signals generated in response to input from a keyboard device and/or from a mouse device, for example. The ICH 310 may receive the input from the keyboard device and/or mouse device via one or more PCI interfaces. The ICH 310 may convert the signals into input data. The ICH 310 may send the input data to the LAN subsystem 314. The LAN subsystem 314 may encapsulate the input data in one or more Ethernet frames. The Ethernet frames may contain a designation within the EtherType field, which indicates that the Ethernet frame may not comprise one or more encapsulated Display Port mini-packets. In this regard, the EtherType designation for Ethernet frames, which comprise one or more encapsulated Display Port mini-packets, may be distinguished from the EtherType designation for Ethernet frames, which do not comprise one or more Display Port mini-packets. The Ethernet frames may be transmitted via the Ethernet connector 318a.

Various embodiments of the invention may utilize a plurality of Ethernet connectors for the reception and/or transmission of Ethernet frames from one or more networks. In an exemplary embodiment of the invention, Ethernet frames, which encapsulate Display Port mini-packets, or which encapsulate compressed video data, may be transmitted/received via the Ethernet connector 318a, while conventional Ethernet frames may be transmitted/received via the Ethernet connector 318b. In various embodiments of the invention, the Ethernet connector 318a may enable transmission and/or reception of Ethernet frames to/from a first network while the Ethernet connector 318b may enable transmission and/or reception of Ethernet frames to/from a second network.

In another exemplary embodiment of the invention, the system may comprise a video server 104. In operation, the CPU 302 may enable generation of compressed video 202. The CPU 302 may also enable the retrieval of compressed video 202 from memory 308. The MCH 304 may enable the high speed transfer of compressed video 202 from the CPU 302 and/or from the memory 308 to the GPU 306. The GPU 306 may process the compressed video to, for example, incorporate graphics. The GPU 306 may also generate instructions, which enable the rendering of the processed compressed video and/or graphics on a multimedia monitor 124. The GPU 306 may generate one or more Display Port mini-packets, each of which may comprise at least a portion of the generated rendering instructions and/or processed compressed video and/or graphics.

The GPU 306 may output the Display Port mini-packets to the LAN subsystem 314. The LAN subsystem 314 may encapsulate the Display Port mini-packets in Ethernet frames. The LAN subsystem 314 may utilize Ethernet MAC layer 214 functionality to enable the utilization of AV Bridging capabilities for the transport of the Ethernet frames via the network 112. The LAN subsystem 314 may utilize Ethernet PHY layer 216 functionality to enable the transmission of the Ethernet frames via the Ethernet connector 318a.

Figure 4:
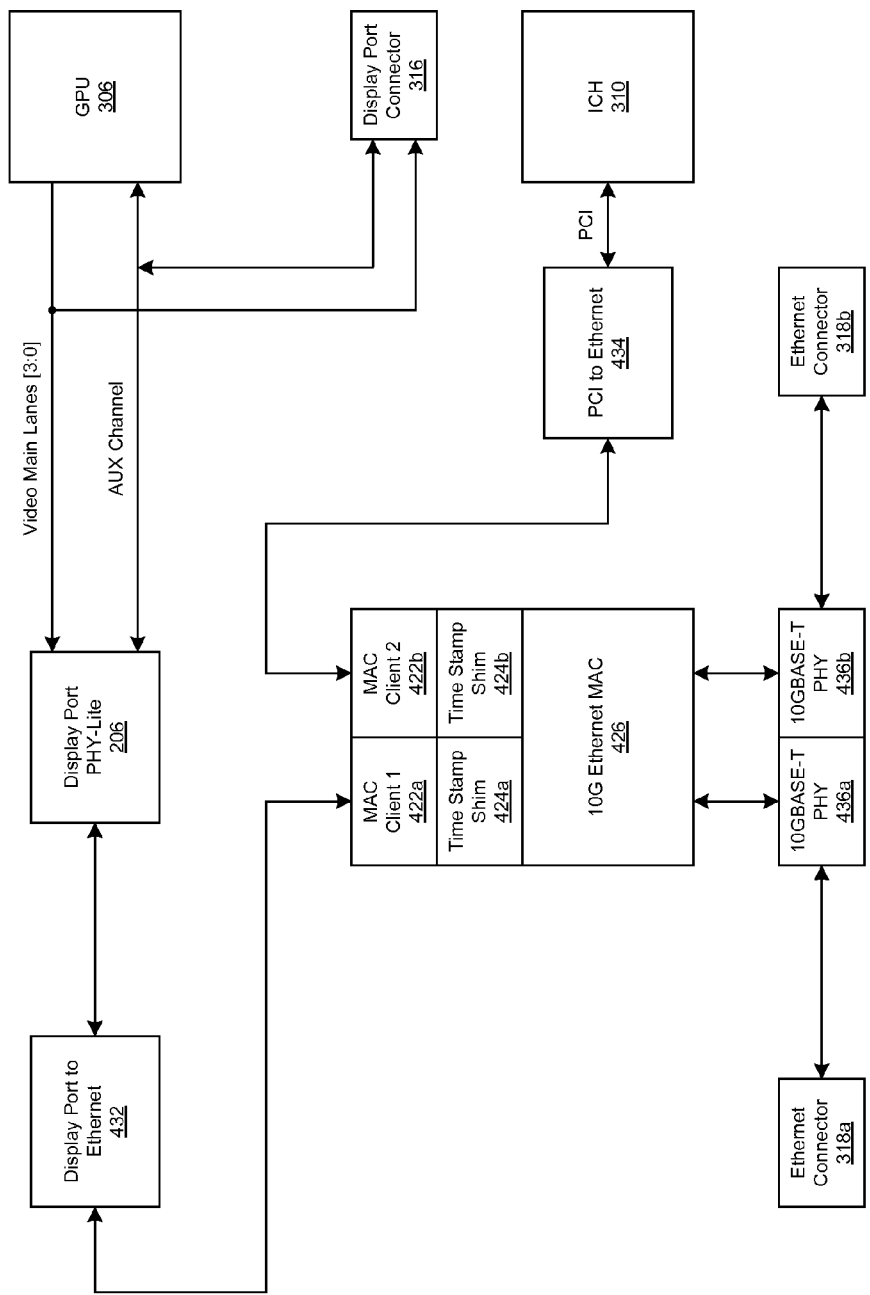
FIG. 4 is a block diagram of an exemplary server system, which supports video rendering by an Ethernet thin client, in accordance with an embodiment of the invention.

FIG. 4 is a block diagram of an exemplary server system, which supports video rendering by an Ethernet thin client, in accordance with an embodiment of the invention. In various embodiments of the invention, the video server 104 (FIG. 1) may represent an exemplary server system, which may support video rendering by an Ethernet thin client. The computing device 122 may represent an exemplary Ethernet thin client. Referring to FIG. 4, there is shown a MAC client 422a, MAC client 422b, time stamp shims 424a and 424b, 10G Ethernet MAC block 426, Display Port to Ethernet block 432, PCI to Ethernet block 434, 10GBASE-T PHY layer blocks 436a and 436b, Display Port PHY-Lite layer 206 (from FIG. 2), GPU 306 (from FIG. 3), ICH 310 (from FIG. 3), Display Port connector 316 (from FIG. 3) and Ethernet connectors 318a and 318b (from FIG. 3).

The GPU 306 may encapsulate data in one or more Display Port mini-packets. The Display Port mini-packets may comprise an identifier, which indicates whether the Display Port mini-packets contain video data or other types of data. The other types of data may be compressed or uncompressed. The GPU 306 may transmit Display Port mini-packets, which contain video data, via the Video Main Lanes [3:0]. The GPU 306 may transmit Display Port mini-packets, which contain other than video data, via the Aux Channel.

The Display Port PHY-Lite layer 206 may receive Display Port mini-packets via at least the Video Main Lanes [3:0] and AUX Channel. The Display Port PHY-Lite layer 206 may generate binary bits.

The Display Port to Ethernet block 432 may enable reception of bits from a Display Port PHY-Lite layer 206. The Display Port to Ethernet block 432 may enable assembly of the bits to form one or more Ethernet payloads. An Ethernet payload may comprise one or more bits from one or more Display Port mini-packets, MP. In an exemplary embodiment of the invention, the Ethernet payload may comprise a plurality of concatenated Display Port mini-packets. In another exemplary embodiment of the invention, the Ethernet payload may comprise a concatenation of payloads from a plurality of Display Port mini-packets with a single Display Port mini-packet header appended to the concatenated payloads.

The MAC client 422a may receive Ethernet payloads from the Display Port to Ethernet block 432 and encapsulate the Ethernet payloads in one or more Ethernet frames, $EF_1$. The Ethernet frames, $EF_1$, may comprise EtherType=DP (where DP may represent a numerical value), which indicates that the Ethernet frames $EF_1$ contain encapsulated Display Port mini-packets. In addition, the Ethernet frames, $EF_1$, may also comprise a field EtherTypeSubType=VID (where VID may represent a numerical value), which indicates that the Display Port mini-packets may contain video data. The Ethernet frames, $EF_1$, may comprise a field EtherTypeSubType=AUX (where AUX may represent a numerical value), which indicates that the Ethernet payloads contain AUX channel data. The subtype may also indicate one or a plurality of multimedia monitors, attached to a computing device, which is to receive the Display Port mini-packets.

The ICH 310 may enable reception of input signals from peripheral devices and the generation of bits from the received input signals. The generated bits may be transmitted via a PCI interface.

The PCI to Ethernet block 434 may enable reception of bits from a PCI interface. The bits may be generated based on input received from a peripheral device. The PCI to Ethernet block 434 may enable assembly of the bits to construct one or more Ethernet payloads EP.

The MAC client 422b may receive Ethernet payloads, EP, and encapsulate the Ethernet payloads in one or more Ethernet frames, $EF_2$. The Ethernet frames $EF_2$ may comprise EtherType≠DP, which indicates that the Ethernet frames $EF_2$ may not contain Display Port mini-packets.

The time stamp shims 424a and 424b may receive Ethernet frames $EF_1$ and $EF_2$ from the corresponding MAC clients 422a and 422b. The time stamp shims 424a and 424b may append time synchronization information, such as a time stamp, to the Ethernet frames $EF_1$ and $EF_2$ based on an EtherType designation, for example. The time stamp shims 424a and 424b may append a time stamp when the EtherType field indicates that the Ethernet frame is to utilize AV Bridging capabilities for transport across a network 112, for example.

The 10G Ethernet MAC block 426 may enable the transmission of the Ethernet frames $EF_1$ and $EF_2$ via the network 112. The 10G Ethernet MAC block 426 may enable generation of header information within the Ethernet frames, which enable the utilization of AV Bridging services within the network 112 for transport of the Ethernet frames. The 10G Ethernet MAC block 426 may also enable traffic shaping of transmitted Ethernet frames by determining time instants at which the Ethernet frames $EF_1$ and $EF_2$ may be transmitted to the network 112. The 10G Ethernet MAC block 426 may also enable generation of header information within the Ethernet frames, which utilize conventional Ethernet services within the network 112. The conventional Ethernet services may not utilize traffic shaping and/or AV Bridging services, for example. In various embodiments of the invention, Ethernet frames, which utilize conventional Ethernet services, may be transported via a network, which is separate from the network 112. The 10G Ethernet MAC block 426 may enable determination of a network, which is to be utilized for the transport of Ethernet frames $EF_1$ and/or $EF_2$.

The 10GBASE-T PHY layer 436a may enable the reception of bits from Ethernet frames. The 10GBASE-T PHY layer 436a may line encode the received bits to enable transmission via an Ethernet connector 318a. The 10GBASE-T PHY layer 436b may be substantially similar to the 10GBASE-T PHY layer 436a. The 10GBASE-T PHY layer 436b may line encode the received bits to enable transmission via an Ethernet connector 318b. 10G is an exemplary Ethernet bit rate; various embodiments of the invention may also be practiced at other bit rates suitable for carrying HD traffic.

The 10GBASE-T PHY layer 436a may also receive line coded bits via the Ethernet connector 318a. The 10GBASE-T PHY layer 436b may also receive line coded bits via the Ethernet connector 318b. The 10GBASE-T PHY layer 436a or 436b may decode the received line coded bits, which may be sent to the 10G Ethernet MAC block 426. The 10G Ethernet MAC block 426 may assemble the received decoded bits to construct one or more Ethernet frames $EF_R$. The 10G Ethernet MAC block 426 may determine whether the constructed Ethernet frames $EF_R$ contain one or more Display Port mini-packets, $MP_R$, or Ethernet payloads, $EP_R$, which may not contain Display Port mini-packets. The 10G Ethernet MAC block 426 may make the determination based on a designation within EtherType field within the received Ethernet frames $EF_R$. The 10G Ethernet MAC block 426 may send the Ethernet frames $EF_R$ to the time stamp shim 424a or 424b.

The time stamp shim 424a may send Ethernet frames, $EF_R$, which contain encapsulated Display Port mini-packets, to the MAC client 422a. The MAC client 422a may determine whether the Ethernet frames contain video data or AUX Channel data based on an EtherTypeSubType field within the Ethernet frames. The MAC client 422a may de-encapsulate the AUX channel data from the Ethernet frames $EF_R$. The MAC client 422a may send the Ethernet payloads to the Display Port to Ethernet block 432. The Display Port to Ethernet block 432 may convert the Ethernet payloads to bits, which may be sent to the Display Port PHY-Lite layer 206. The Display Port PHY-Lite layer 206 may assemble the bits to reconstruct the AUX channel data. The AUX channel data may be sent to the GPU 306 via the AUX Channel. The GPU 306 may transfer the data to the MCH 304. The MCH 304 may in turn transfer the data to the CPU 302, which may process the data. The AUX channel data may be sent to the multimedia monitor 124 via the AUX Channel.

The time stamp shim 424b may send Ethernet frames, $EF_R$, which do not contain encapsulated Display Port mini-packets to the MAC client 422b. The MAC client 422b may de-encapsulate the Ethernet payloads, $EP_R$, from the received Ethernet frames $EF_R$. The MAC client 422b may send the Ethernet payloads $EP_R$ to the PCI to Ethernet block 434. The PCI to Ethernet block 434 may convert the Ethernet payloads $EP_R$ to signals, which may be sent to the ICH 310. The ICH 310 may convert the signals to bits, which may be sent to the CPU 302 via the MCH 304. The CPU 302 may process the data.

In an exemplary embodiment of the invention, the LAN subsystem 314 may comprise the Display Port to Ethernet block 432, the Display Port PHY-Lite layer 206, the MAC clients 422a and 422b, the time stamp shims 424a and 424b, the 10G Ethernet MAC block 426 and the PCI to Ethernet block 434. In another exemplary embodiment of the invention, the LAN subsystem 314 may comprise the Display Port to Ethernet block 432, the Display Port PHY-Lite layer 206, the MAC clients 422a and 422b, the time stamp shims 424a and 424b, the 10G Ethernet MAC block 426, the PCI to Ethernet block 434 and the 10GBASE-T PHY layer blocks 436a and 436b.

Various embodiments of the invention as shown in FIG. 4 may not be limited to 10G Ethernet networks, but may also be practiced in 100G Ethernet networks and/or 1000G Ethernet networks, for example.

Figure 5:
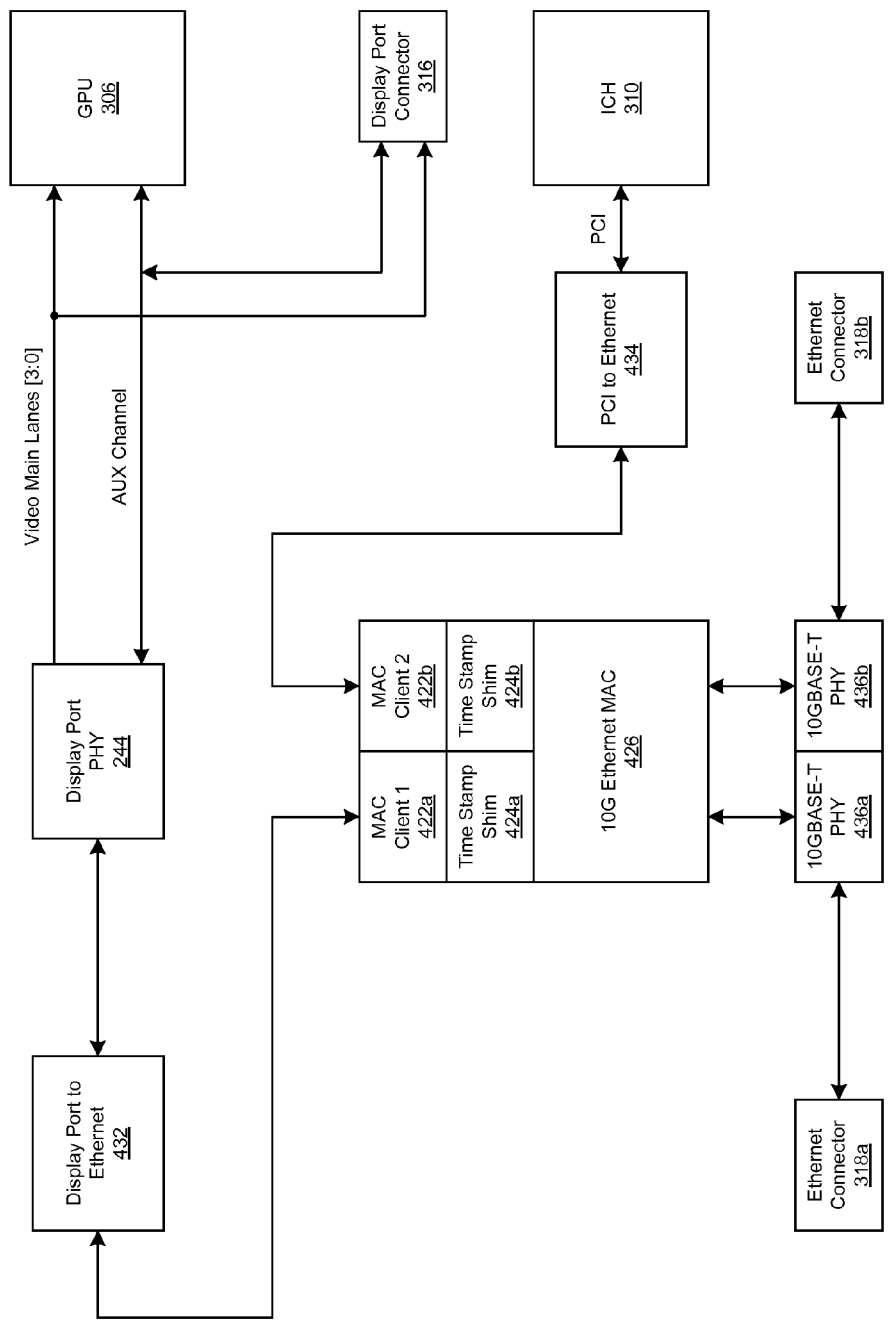
FIG. 5 is a block diagram of an exemplary thin client, in accordance with an embodiment of the invention.

FIG. 5 is a block diagram of an exemplary thin client, in accordance with an embodiment of the invention. In various embodiments of the invention, the computing device 122 (FIG. 1) may represent an exemplary Ethernet thin client. Referring to FIG. 5, there is shown a MAC client 422a, MAC client 422b, time stamp shims 424a and 424b, 10G Ethernet MAC block 426, Display Port to Ethernet block 432, PCI to Ethernet block 434, 10GBASE-T PHY layer blocks 436a and 436b, Display Port PHY layer 244 (from FIG. 2), GPU 306 (from FIG. 3), ICH 310 (from FIG. 3), Display Port connector 316 (from FIG. 3) and Ethernet connectors 318a and 318b (from FIG. 3).

The 10GBASE-T PHY layer 436a may receive line coded bits via the Ethernet connector 318a. The 10GBASE-T PHY layer 436b may receive line coded bits via the Ethernet connector 318b. The 10GBASE-T PHY layer 436a or 436b may decode the received line coded bits, which may be sent to the 10G Ethernet MAC block 426. The 10G Ethernet MAC block 426 may assemble the received decoded bits to construct one or more Ethernet frames $EF_R$. The 10G Ethernet MAC block 426 may determine whether the constructed Ethernet frames $EF_R$ contain one or more Display Port mini-packets, $MP_R$, or Ethernet payloads, $EP_R$, which may not contain Display Port mini-packets. The 10G Ethernet MAC block 426 may make the determination based on a designation within EtherType field within the received Ethernet frames $EF_R$. The 10G Ethernet MAC block 426 may send the Ethernet frames $EF_R$ to the time stamp shim 424a or 424b.

The time stamp shim 424a may send Ethernet frames, $EF_R$, which contain encapsulated Display Port mini-packets, to the MAC client 422a. Additionally, the MAC client 422a may determine whether the Ethernet frames contain compressed video data or AUX Channel data based on an EtherTypeSubType field within the Ethernet frames. At a computing device 122, received Display Port mini-packets $MP_R$ may contain video data. The computing device 122 may also receive AUX Channel data. The MAC client 422a may de-encapsulate the Display Port mini-packets $MP_R$ from the Ethernet frames $EF_R$. The MAC client 422a may send the Display Port mini-packets $MP_R$ to the Display Port to Ethernet block 432. The Display Port to Ethernet block 432 may convert the Display Port mini-packets $MP_R$ to bits, which may be sent to the Display Port PHY-Lite layer 206. The Display Port PHY-Lite layer 206 may assemble the bits to reconstruct the Display Port mini-packets $MP_R$.

In the case where the Display Port mini-packets contain compressed video data, the Display Port mini-packets may be sent to the Display Port connector 316 via the Video Main Lanes [3:0]. The Display Port mini-packets may be sent to the multimedia monitor 124, which may decompress the compressed video to generate uncompressed video. The uncompressed video may be displayed at the multimedia monitor 124. In instances where the Ethernet frames may comprise AUX channel data, the AUX channel data may be sent to the GPU 306 via the AUX Channel. The GPU 306 may transfer the data to the MCH 304. The MCH 304 may in turn transfer the data retrieved from the received Display Port mini-packets to the CPU 302, which may process the data. The Display Port mini-packets $MP_R$ may be sent to the multimedia monitor 124 via the AUX Channel. In this regard, the multimedia monitor 124 may receive encryption keys, which may be utilized in connection with digital content protection, for example.

The time stamp shim 424b may send Ethernet frames, $EF_R$, which do not contain encapsulated Display Port mini-packets to the MAC client 422b. The MAC client 422b may de-encapsulate the Ethernet payloads, $EP_R$, from the received Ethernet frames $EF_R$. The MAC client 422b may send the Ethernet payloads $EP_R$ to the PCI to Ethernet block 434. The PCI to Ethernet block 434 may convert the Ethernet payloads $EP_R$ to signals, which may be sent to the ICH 310. The ICH 310 may convert the signals to bits, which may be sent to the CPU 302 via the MCH 304. The CPU 302 may process the data.

In an exemplary embodiment of the invention, the LAN subsystem 314 may comprise the Display Port to Ethernet block 432, the Display Port PHY layer 244, the MAC clients 422a and 422b, the time stamp shims 424a and 424b, the 10G Ethernet MAC block 426 and the PCI to Ethernet block 434. In another exemplary embodiment of the invention, the LAN subsystem 314 may comprise the Display Port to Ethernet block 432, the Display Port PHY layer 244, the MAC clients 422a and 422b, the time stamp shims 424a and 424b, the 10G Ethernet MAC block 426, the PCI to Ethernet block 434 and the 10GBASE-T PHY layer blocks 436a and 436b.

In various embodiments of the invention, the video server 104 may selectively transmit compressed video 202 to one or more of a plurality of video monitors 124, each of which may be connected, by point-to-point connection, to a corresponding computing device 122.

The video server 104 may generate Display Port mini-packets, which may be selectively displayed on one or more of a plurality of multimedia monitors. In this regard, the physical Video Main Lanes [3:0] and AUX Channel group shown in FIG. 4, may represent a plurality of logical Video Main Lanes [3:0] and AUX Channel groups, wherein each logical group may correspond to one of the plurality of multimedia monitors 124. Each logical group may be distinguished based on the Ethernet MAC address associated with the computing device 122 to which the multimedia monitor 124 may be connected by point-to-point connection, for example.

The GPU 306 within the video server 104 may generate Display Port mini-packets comprising compressed video 202 for rendering at the selected multimedia monitor 124, which is attached to the destination computing device 122. The GPU 306 may select a logical Video Main Lanes [3:0] and AUX Channel group, which corresponds to the selected multimedia monitor 124 based on the Ethernet MAC address associated with the computing device 122, to which the multimedia monitor 124 may be connected. The GPU 306 may generate one or more Display Port mini-packets, which may be sent to the Display Port-Lite layer 206 via the Video Main Lanes [3:0] or AUX Channel. The Display Port mini-packet may comprise a destination identifier, which identifies a logical Video Main Lanes [3:0] and AUX Channel group, which in turn identifies the destination computing device 122. The Display Port mini-packets may be sent from the Display Port-Lite layer 206 to the Display Port to Ethernet block 432. The Display Port to Ethernet block 432 may in turn send the Display Port mini-packets to the MAC client 422a.

The MAC client 422a may encapsulate the Display Port mini-packets in Ethernet frames and send the Ethernet frames to the 10G Ethernet MAC block 426. The MAC client 422a may designate a value in the Destination Address field within the Ethernet frame, which corresponds to the MAC address for the destination computing device 122, based on the destination identifier information associated with the received Display Port mini-packets. The Ethernet frames may be sent to the time stamp shim 424a, which may insert a time stamp within the Ethernet frame. The time stamped Ethernet frame may then be sent to the 10G Ethernet MAC block 426.

The 10G Ethernet MAC block 426 may generate a value for insertion in the EtherTypeSubType field within the Ethernet frames based on whether the Display Port mini-packets contain video data or AUX channel data. The 10G Ethernet MAC block may also insert fields within the Ethernet header which enable the utilization of AV Bridging capabilities for the transport of the Ethernet frame within the network 112, for example a traffic class designation. The Ethernet frames may be sent to the 10GBASE-T PHY block 436a or 436b, which may subsequently transmit bits via the corresponding Ethernet connector 318a or 318b. The Ethernet frames may be transmitted via the network 112 or another network. The destination address for the Ethernet frames may indicate that the destination is the computing device 122, which is connected via a point-to-point connection to the selected multimedia monitor 124.

Similarly, each of the multimedia monitors 124 may transmit AUX channel data to the video server 104, for example encryption keys. The multimedia monitor(s) sending the AUX channel data may generate one or more Display Port mini-packets. The AUX channel data may be transmitted via a corresponding AUX channel and received by the Display Port PHY layer 244. The AUX channel data may be generated by the CPU 302 and communicated to the GPU 306 via the MCH 304. The GPU 306 may then generate the Display Port mini-packets, which may be sent via the AUX channel. The Display Port mini-packets may be sent to the Display Port to Ethernet block 432. The Display Port to Ethernet block 432 may in turn send the Display Port mini-packets to the MAC client 422a. The MAC client 422a may encapsulate the Display Port mini-packets in Ethernet frames and send the Ethernet frames to the 10G Ethernet MAC block 426.

The 10G Ethernet MAC block 426 may send the Ethernet frames to the 10GBASE-T PHY block 436a or 436b, which may subsequently transmit bits via the corresponding Ethernet connector 318a or 318b. The Ethernet frames may be transmitted via the network 112 or another network. The Destination Address within the Ethernet frames may indicate that the destination is the video server 104. The Source Address within the Ethernet frames may indicate the computing device 122 from which the Ethernet frames were sent. The video server 104 may receive the Ethernet frames, which contain Display Port mini-packets. The video server 104 may identify the multimedia monitor 124 associated with the Display Port mini-packets based on the Source Address field contained within the received Ethernet frames.

Figure 10A:
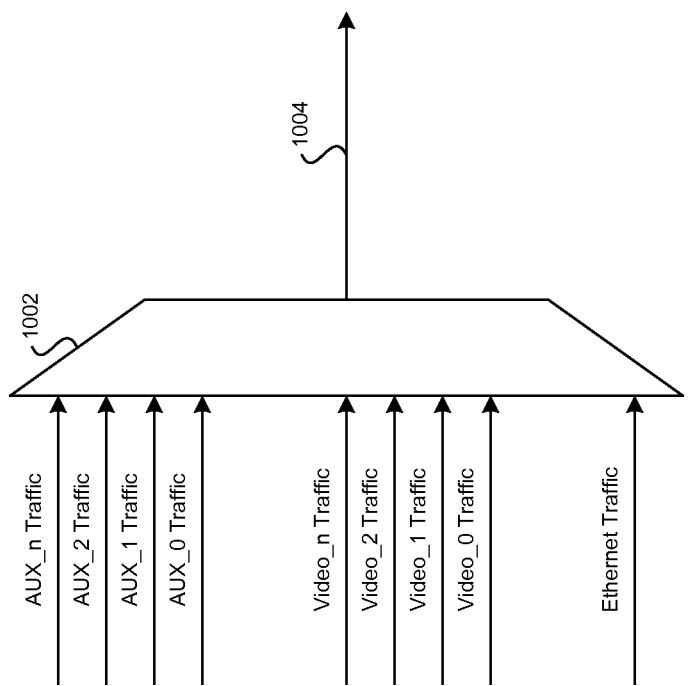
FIG. 10A is an exemplary illustration of egress traffic at a server, in accordance with an embodiment of the invention.

FIG. 10A is an exemplary illustration of egress traffic at a server, in accordance with an embodiment of the invention. FIG. 10A shows a multiplexer 1002, which receives video traffic (Video_0 Traffic, Video_1 Traffic, Video_2 Traffic and Video_n Traffic) from a plurality of logical Video Lanes[3:0], AUX Channel traffic (AUX_0 Traffic, AUX_1 Traffic, AUX_2 Traffic and AUX_n Traffic) from a plurality of logical AUX Channels and conventional Ethernet traffic (Ethernet Traffic). The multiplexer 1002 may multiplex the various traffic sources for transmission via one or more Ethernet interface connectors 1004. The video traffic may be destined for a corresponding plurality of multimedia monitors which may be coupled to one or more computing devices. Each of the AUX channels may correspond to one of the logical Video Lanes[3:0]. Traffic from the various video traffic sources, AUX channel sources and Ethernet traffic source may be distinguished based on an EtherType and/or an EtherTypeSubType.

Figure 10B:
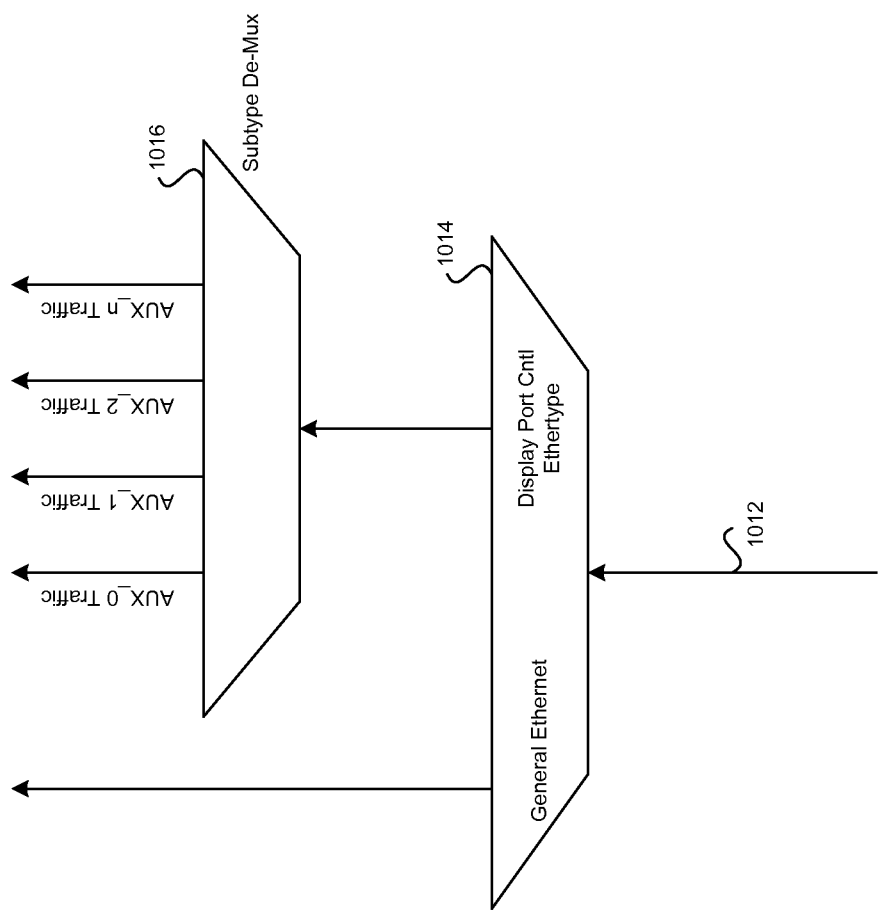
FIG. 10B is an exemplary illustration of ingress traffic at a server, in accordance with an embodiment of the invention.

FIG. 10B is an exemplary illustration of ingress traffic at a server, in accordance with an embodiment of the invention. FIG. 10B shows a demultiplexer 1014, which receives Ethernet frames via an Ethernet interface connector 1012. The demultiplexer 1014 may distinguish Ethernet frames, which comprise general Ethernet data, from Ethernet frames, which comprise Display Port control information, based on an EtherType. The subtype demultiplexer 1016 may distinguish Ethernet frame, which comprise AUX Channel traffic (AUX_0 Traffic, AUX_1 Traffic, AUX_2 Traffic and AUX_n Traffic) from a plurality of AUX Channels based on an EtherTypeSubType. The AUX Channel traffic may be received from a computing device to which are connected a plurality of multimedia monitors.

Figure 11A:
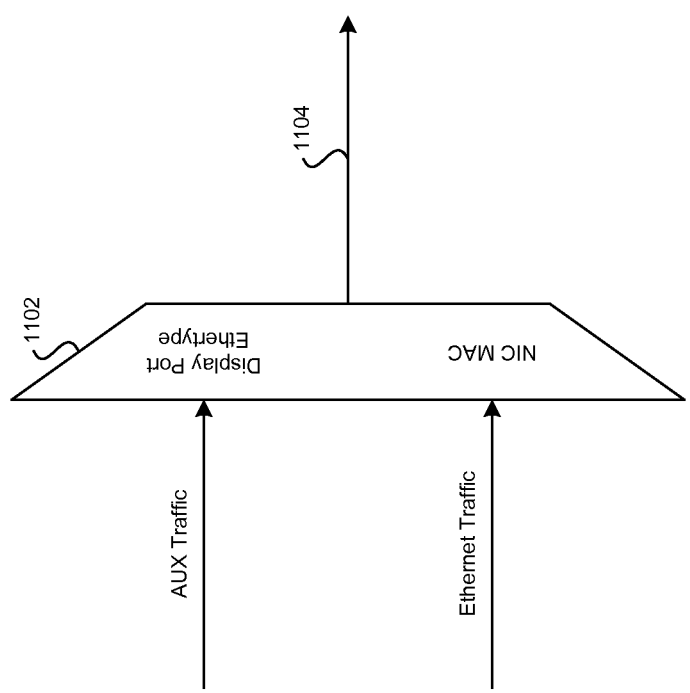
FIG. 11A is an exemplary illustration of egress traffic at a client, in accordance with an embodiment of the invention.

FIG. 11A is an exemplary illustration of egress traffic at a client, in accordance with an embodiment of the invention. FIG. 11A shows a multiplexer 1102, which receives AUX Channel traffic (AUX Traffic) from an AUX Channel and conventional Ethernet traffic (Ethernet Traffic). The multiplexer 1002 may multiplex the various traffic sources for transmission via one or more Ethernet interface connectors 1104. The AUX Channel traffic may be destined for a video server. Traffic from the AUX channel source and Ethernet traffic source may be distinguished based on an EtherType.

Figure 11B:
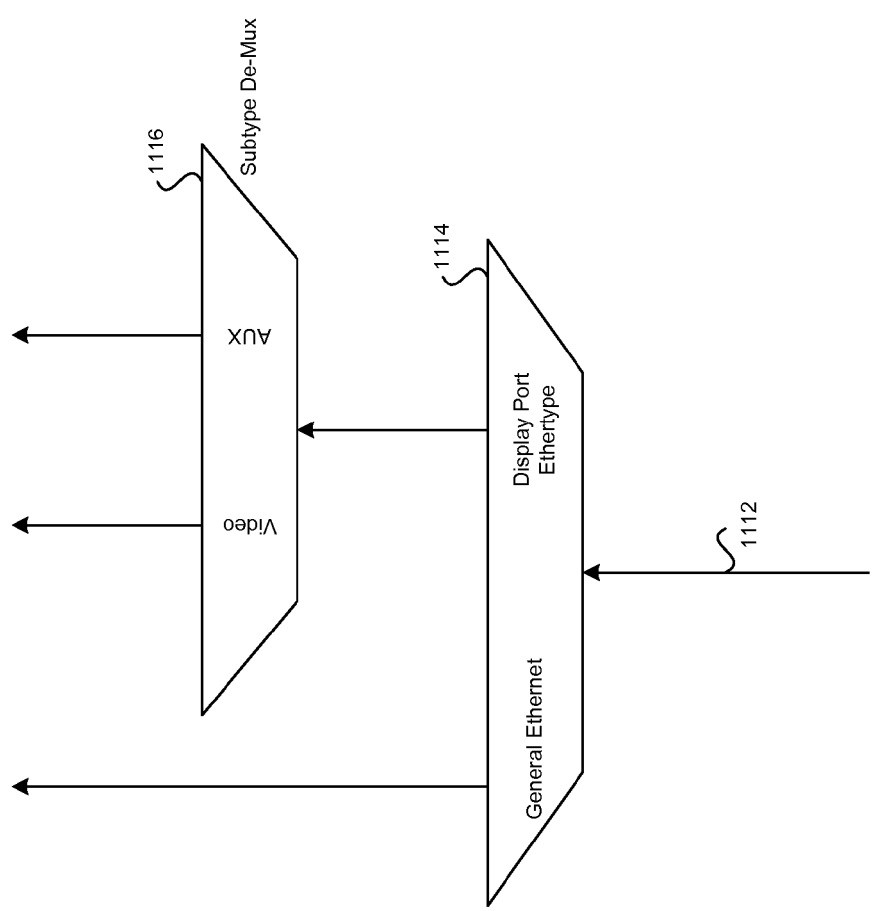
FIG. 11B is an exemplary illustration of ingress traffic at a client, in accordance with an embodiment of the invention.

FIG. 11B is an exemplary illustration of ingress traffic at a client, in accordance with an embodiment of the invention. FIG. 11B shows a demultiplexer 1114, which receives Ethernet frames via an Ethernet interface connector 1112. The demultiplexer 1114 may distinguish Ethernet frames, which comprise general Ethernet data, from Ethernet frames, which comprise Display Port information based on an EtherType. The subtype demultiplexer 1116 may distinguish Ethernet frames, which comprise compressed video data traffic, from Ethernet frames, which comprise AUX Channel traffic, based on an EtherTypeSubType. The compressed video data traffic and/or AUX Channel traffic may be received from a video server.

Figure 6:
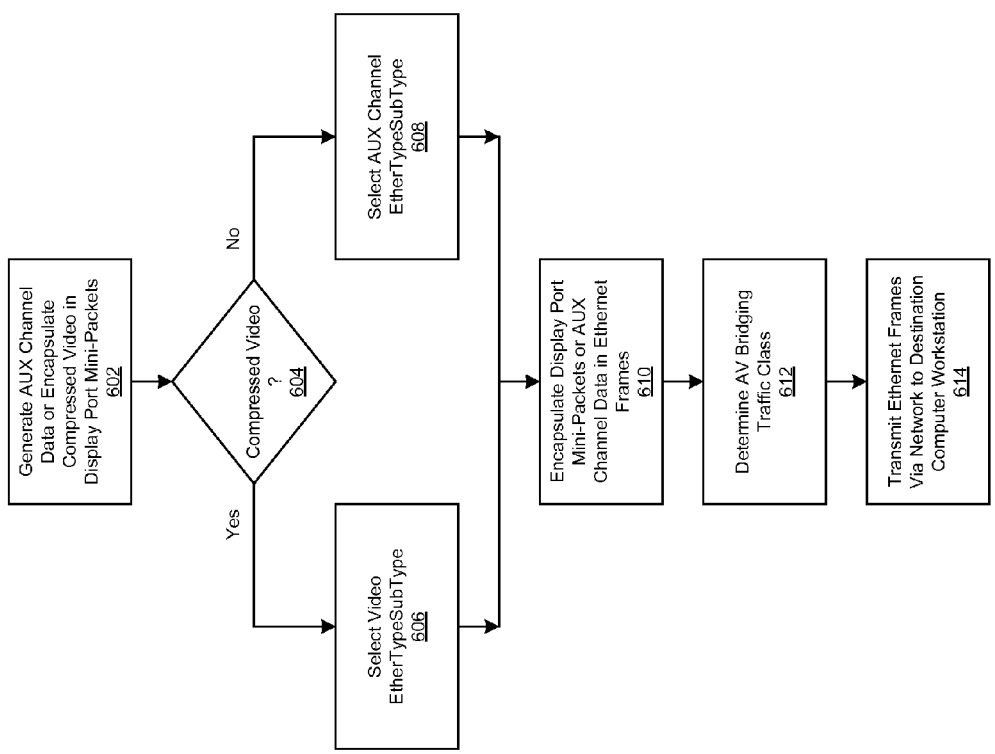
FIG. 6 is a flowchart illustrating exemplary steps for transporting encapsulated Display Port mini-packets via an Ethernet network, in accordance with an embodiment of the invention.

FIG. 6 is a flowchart illustrating exemplary steps for transporting encapsulated Display Port mini-packets via an Ethernet network, in accordance with an embodiment of the invention. The flowchart of FIG. 6 is exemplary as various embodiments of the invention may also be practiced with other compressed video protocols, including HD video. Referring to FIG. 6, in step 602, the GPU 306 within the video server 104 may generate AUX channel information or encapsulate compressed video in Display Port mini-packets. Step 604 may determine whether compressed video 202 is to be transported via the network. When the Display Port mini-packets contain compressed video, in step 606, the EtherTypeSubType field may be set to a value indicating video. When the Display Port mini-packets do not contain compressed video data, in step 608, the EtherTypeSubType field may be set to a value indicating AUX channel information. In step 610, the Display Port mini-packets or AUX channel data may be encapsulated in Ethernet frames by the MAC client 422a within the LAN subsystem 314. In step 612, the 10G Ethernet MAC block 426 may determine an AV Bridging traffic class. In step 614, the LAN subsystem 314 may transmit the Ethernet frames via the network 112 to the computing device 122.

Figure 7:
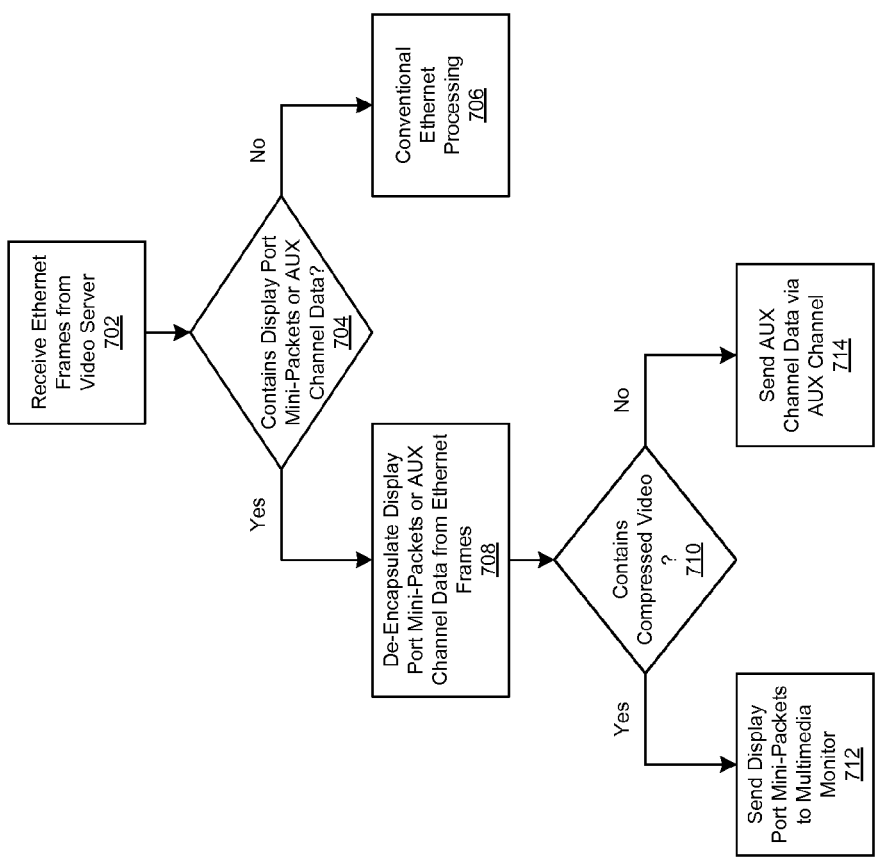
FIG. 7 is a flowchart illustrating exemplary steps for receiving encapsulated Display Port mini-packets via an Ethernet network, in accordance with an embodiment of the invention.

FIG. 7 is a flowchart illustrating exemplary steps for receiving encapsulated Display Port mini-packets via an Ethernet network, in accordance with an embodiment of the invention. The flowchart of FIG. 7 is exemplary as various embodiments of the invention may also be practiced with other compressed video protocols, including HD video. Referring to FIG. 7, in step 702, the computing device 122 may receive Ethernet frames from the video server 104 via the network 112. Step 704 may determine whether the received Ethernet frames contain Display Port mini-packets or AUX channel data. When the received Ethernet frames do not contain Display Port mini-packets or AUX channel data, in step 706, the received Ethernet frames may be processed utilizing conventional Ethernet processing. In this regard, the Ethernet frames may be sent to the MAC client 422b within the LAN subsystem 314. When the received Ethernet frames contain Display Port mini-packets, in step 708, the MAC client 422a may de-encapsulate the Display Port mini-packets or AUX channel data from the Ethernet frames. Step 710 may determine whether the Ethernet frames contain compressed video data. When the Ethernet frames contain compressed video data, in step 712, the Display Port mini-packets may be sent to the multimedia monitor 124. The multimedia monitor 124 may decompress the compressed video to generate uncompressed video. The multimedia monitor 124 may render the uncompressed video on the monitor. In various embodiments of the invention, the computing device 122 may decompress the compressed video to generate uncompressed video, encapsulate the uncompressed video within one or more Display Port mini-packets, and send the Display Port mini-packets, which contain the uncompressed video data, to the multimedia monitor 124. When the Ethernet frames do not contain compressed video, in step 714, the AUX channel data may be sent via an AUX channel to the GPU 306 and/or multimedia monitor 124. The AUX channel data sent to the GPU 306 may subsequently be sent to the CPU 302.

Figure 8:
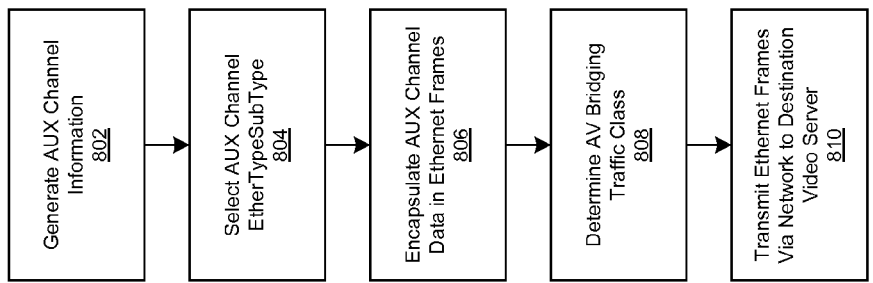
FIG. 8 is a flowchart illustrating exemplary steps for transporting AUX channel information within encapsulated Display Port mini-packets via an Ethernet network, in accordance with an embodiment of the invention.

FIG. 8 is a flowchart illustrating exemplary steps for transporting AUX channel information within encapsulated Display Port mini-packets via an Ethernet network, in accordance with an embodiment of the invention. The flowchart of FIG. 8 is exemplary as various embodiments of the invention may also be practiced with other compressed video protocols, including HD video. Referring to FIG. 8, in step 802, the GPU 306 within the computing device 122 may generate AUX channel information. In step 804, the EtherTypeSubType field may be set to a value indicating AUX channel information. In step 806, the AUX channel data may be encapsulated in Ethernet frames by the MAC client 422a within the LAN subsystem 314. In step 808, the 10G Ethernet MAC block 426 may determine an AV Bridging traffic class. In step 810, the LAN subsystem 314 may transmit the Ethernet frames via the network 112 to the video server 104.

Figure 9:
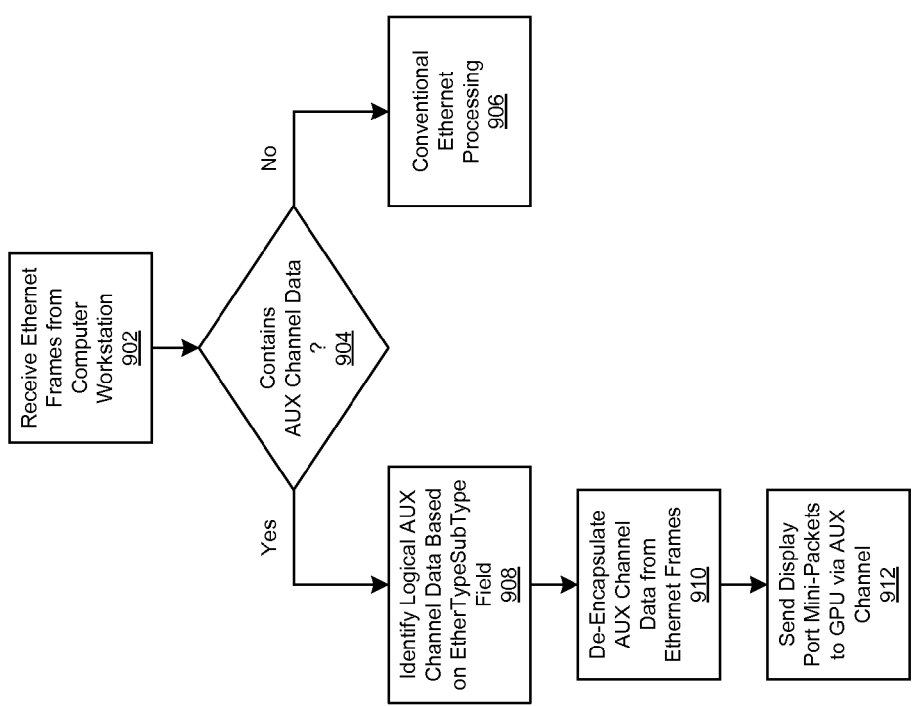
FIG. 9 is a flowchart illustrating exemplary steps for receiving AUX channel information within encapsulated Display Port mini-packets via an Ethernet network, in accordance with an embodiment of the invention.

FIG. 9 is a flowchart illustrating exemplary steps for receiving AUX channel information within encapsulated Display Port mini-packets via an Ethernet network, in accordance with an embodiment of the invention. The flowchart of FIG. 9 is exemplary as various embodiments of the invention may also be practiced with other compressed video protocols, including HD video. Referring to FIG. 9, in step 902, the video server 104 may receive Ethernet frames from the computing device 122 via the network 112. Step 904 may determine whether the received Ethernet frames contain AUX channel data. When the received Ethernet frames do not contain Display Port mini-packets, in step 906, the received Ethernet frames may be processed utilizing conventional Ethernet processing. In this regard, the Ethernet frames may be sent to the MAC client 422b within the LAN subsystem 314. When the received Ethernet frames contain AUX channel data, in step 908, the 10G Ethernet MAC block 426 may identify a logical AUX channel based on the EtherTypeSubType field. The logical AUX channel may identify an AUX channel associated with a multimedia monitor 124 attached to the computing device 122. In step 910, the received the MAC client 422a may de-encapsulate the AUX channel data from the Ethernet frames. In step 912, the AUX channel data may be sent to the GPU 306 via the AUX channel. The data may subsequently be sent to the CPU 302.

Various embodiments of the invention may also comprise the transmission of audio data across a network 112, where the audio data is associated with the uncompressed video data, which is also transmitted across the network 112. The video data and/or audio data may be received at the destination computing device 122 where the video data may be rendered on a multimedia monitor and the audio data may be presented via speakers. In various embodiments of the invention, the speakers may be incorporated within the multimedia monitor.

In various exemplary embodiments of the invention a video server 104 may receive and/or generate Display Port mini-packets, which contain compressed video data. The Display Port mini-packets may be encapsulated within Ethernet frames and transported via a network 112 to a computing device 122. The computing device 122 may determine that the Ethernet frames encapsulate Display Port mini-packets, which contain compressed video data based on an EtherType and/or EtherTypeSubType, for example. The computing device 122 may de-encapsulate the Display Port mini-packets from the received Ethernet frames. In an exemplary embodiment of the invention, the computing device 122 may send the Display Port mini-packets to an attached multimedia monitor 124 for rendering of the compressed video. In another exemplary embodiment of the invention, the computing device 122 may de-encapsulate the Display Port mini-packets from the received Ethernet frames, de-encapsulate the compressed video from the Display Port mini-packets, de-compress the compressed video to generate uncompressed video, generate one or more Display Port mini-packets to encapsulate the uncompressed video, and send the generated Display Port mini-packets to the multimedia monitor 124 for rendering of the uncompressed video.

In other various embodiments of the invention, a video server 104 may receive and/or generate Display Port mini-packets, which contain uncompressed video data. The video server 104 may compress the Display Port mini-packets by utilizing various data compression methods. The compressed Display Port mini-packets may be encapsulated within one or more Ethernet frames and transported via a network 112 to a computing device 122. The computing device 122 may determine that the Ethernet frames encapsulate compressed Display Port mini-packets based on an EtherType and/or EtherTypeSubType, for example. The computing device 122 may de-encapsulate the compressed Display Port mini-packets from the received Ethernet frames. The computing device 122 may de-compress the compressed Display Port mini-packets to generate uncompressed Display Port mini-packets. The uncompressed Display Port mini-packets may contain uncompressed video data. The computing device 122 may send the uncompressed Display Port mini-packets to an attached multimedia monitor 124 for rendering of the uncompressed video.

In various other embodiments of the invention, a video server 104 may receive and/or generate Display Port mini-packets, which contain uncompressed video data wherein the video server 104 may de-encapsulate the uncompressed video data from the Display Port mini-packets. Various video and/or data compression methods may be applied to the uncompressed video data to generate compressed video data. One or more Display Port mini-packets may be generated to encapsulate the generated compressed video data. The generated Display Port mini-packets may be encapsulated within one or more Ethernet frames and transported via a network 112 to a computing device 122. The computing device 122 may determine that the Ethernet frames encapsulate Display Port mini-packets, which contain compressed video data based on an EtherType and/or EtherTypeSubType, for example. The computing device 122 may process the received Ethernet frames by utilizing a method, which is substantially as described above.

In various other embodiments of the invention, a video server 104 may receive and/or generate compressed video data. The compressed video data may be encapsulated within one or more Ethernet frames and transported via a network 112 to a computing device 122. The computing device 122 may determine that the Ethernet frames encapsulate compressed video data based on an EtherType and/or EtherTypeSubType, for example. The computing device 122 may decompress the received compressed video data to generate uncompressed video data. The computing device 122 may encapsulate the uncompressed video data in one or more Display Port mini-packets. The computing device 122 may send the Display Port mini-packets to a multimedia monitor for rendering of the uncompressed video data.

Various embodiments of the invention may be practiced in a wide range of applications involving the exchange of data, which may be conventionally transported across point-to-point links, and are not limited to transport the transport of Display Port traffic. For example, various embodiments of the invention may be practiced in connection with compressed video (including HD video) applications. DVI is an example of an interface, which is utilized for the transport of compressed video data via point-to-point links. In this regard, various embodiments of the invention may enable compressed video data to be directly encapsulated within one or more Ethernet frames and transported across a network 112. The Ethernet frames may comprise an EtherType field designation, which indicates that the Ethernet frames are being utilized to encapsulate the compressed video data. The Ethernet frames may also comprise a traffic class identifier, which may enable the network 112 to provide services for the transport of the Ethernet frames in accordance with AV Bridging specifications.

The high definition multimedia interface (HDMI) standard defines an example of an interface and protocol, which may be utilized for the transport of compressed video data. In this regard, various embodiments of the invention may enable compressed HDMI video data to be encapsulated within one or more Ethernet frames and transported across a network 112. The Ethernet frames may comprise an EtherType field designation, which indicates that the Ethernet frames are being utilized to encapsulate compressed HDMI video data.

Various embodiments of the invention may not be limited to Ethernet networks but may also be practiced with other network technologies, such as token ring, fibre distributed data interface (FDDI) and Asynchronous Transfer Mode (ATM) networks. Various embodiments of the invention may not be limited to LANs but may also be practiced in wider area networks, such as virtual LANs (VLAN) and metropolitan area networks (MAN), for example. Various embodiments of the invention may also be practiced in wireless networks, for example wireless LANs, such as specified in IEEE 802.11 standards, for example. For example, various embodiments of the invention may be practiced with different network technologies by configuring the LAN subsystem 314 (FIG. 3) based on code and/or data contained within the memory 320.

Aspects of a system for transforming compressed video traffic to network-aware Ethernet traffic with A/V bridging capabilities and A/V bridging extensions may include a graphics processing unit (GPU) 306 that may enable encapsulation of compressed video data within a Display Port protocol data unit (PDU). A LAN subsystem 314 may enable encapsulation of the Display Port PDU within an encapsulating PDU. The LAN subsystem 314 may enable determination of a traffic class designation associated with the encapsulating PDU. The LAN subsystem 314 may enable transmission of the encapsulating PDU via a network 112 based on the traffic class designation.

The LAN subsystem may enable indication of whether the encapsulating PDU encapsulates the Display Port PDU based on a first data type identifier. The first data type identifier may be an EtherType. The LAN subsystem 314 may enable indication of whether the Display Port PDU encapsulates compressed video data based on a second data type identifier. The second data type identifier may be an EtherTypeSubType. The latency time associated with transmitting the encapsulating PDU via the network 112 may be determined based on the traffic class designation. The encapsulating PDU may comprise an Ethernet frame and/or an Internet Protocol (IP) packet. The Display Port PDU may comprise mini-packet.

Aspects of a method for transforming Display Port (DP) traffic to A/V bridging and A/V bridging extensions traffic over one or more Ethernet links using compression may include receiving an encapsulating PDU via a network 112 at a destination device 122, determining a data type contained within the encapsulating PDU, extracting a Display Port PDU encapsulated within the encapsulating PDU based on the data type, transmitting the Display Port PDU via a Display Port connector 316, decompressing compressed video contained within the Display Port PDU to generate uncompressed video and rendering the generated uncompressed video data via a multimedia monitor 124.

The encapsulating PDU may comprise an address field, which enables the network 112 to deliver the encapsulating PDU to the destination device 122. The delivery of the encapsulating PDU may be based on a traffic class designation. The latency time associated with the delivery of the encapsulating PDU by the network 112 may be determined based on the traffic class designation.

The multimedia monitor 124 may be physically connected to the destination device 122 via an interface connector 136. The encapsulating PDU may comprise an Ethernet frame and/or an Internet Protocol (IP) packet. The Display Port PDU may comprise a mini-packet. The data type may be determined based on at least one data type identifier. A first data type identifier may enable determination that a Display Port PDU or auxiliary channel data is encapsulated within the encapsulating PDU. A second data type identifier may enable determination of whether the Display Port PDU or auxiliary channel data is encapsulated within the encapsulating PDU. The first data type identifier may be an EtherType, while the second data type identifier may be an EtherTypeSubType.

Another embodiment of the invention may provide a machine-readable storage, having stored thereon, a computer program having at least one code section executable by a machine, thereby causing the machine to perform the steps as described herein for transforming compressed video traffic to network-aware Ethernet traffic with A/V bridging capabilities and A/V bridging extensions.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for transferring data in a data communication system, the method comprising:
   extracting a Display Port protocol data unit (PDU) encapsulated within a networking or transport protocol received at a destination device via a network, wherein said Display Port PDU comprises an identifier that identifies whether auxiliary data or compressed video data is encapsulated within said Display Port PDU;
   when compressed video data and video data rendering instructions are encapsulated within said Display Port PDU based on said identifier, transmitting said Display Port PDU, without extracting the compressed video data from the Display Port PDU, to a multimedia monitor coupled to said destination device via a Display Port connector;
   when auxiliary data is encapsulated within said Display Port PDU based on said identifier, transmitting said auxiliary data, without extracting the auxiliary data from the Display Port PDU, to said multimedia monitor coupled to said destination device via an auxiliary channel of said Display Port connector,
   wherein said transmitting enables decompression of compressed video data contained within said Display Port PDU and rendering of resulting uncompressed video on said multimedia monitor.

2. The method according to claim 1, wherein said networking or transport protocol comprises an address field which enables said network to deliver said encapsulating PDU to said destination device.

3. The method according to claim 2, wherein delivery of said networking or transport protocol by said network is based on a traffic class designation in accordance with an audio visual (AV) bridging specification service requirement.

4. The method according to claim 3, wherein a latency associated with said delivery of said networking or transport protocol by said network is determined based on said traffic class designation.

5. The method according to claim 1, wherein said networking or transport protocol comprises at least one of an Ethernet frame or an Internet Protocol (IP) packet including a data type identifier that identifies whether said Display Port PDU or general data is encapsulated within said networking or transport protocol.

6. The method according to claim 1, wherein said Display Port PDU comprises a mini-packet of at least one of said auxiliary data or said compressed video data, said auxiliary data comprising one or more control signals of an input or output device or of an encryption key exchange.

7. The method according to claim 1, comprising extracting said Display Port PDU from said networking or transport protocol based on a data type.

8. The method according to claim 7, wherein said data type is determined based on a data type identifier of said networking or transport protocol.

9. The method according to claim 8, wherein:
   said identifier that identifies whether auxiliary data or compressed video data is encapsulated within said Display Port PDU comprises a data sub-type identifier of said Display Port PDU; and
   said method further comprises determining whether said Display Port PDU comprises said auxiliary data within said Display Port PDU based on said data sub-type identifier of said Display Port PDU.

10. The method according to claim 9,
    comprising determining whether said Display Port PDU is encapsulated within said networking or transport protocol based on a data type identifier of said networking or transport protocol.

11. The method according to claim 10, comprising determining whether to transmit said auxiliary data to a processing unit of said auxiliary data based on said data sub-type identifier of said Display Port PDU.

12. The method according to claim 11, wherein said data type identifier of said networking or transport protocol comprises an EtherType data identifier and said data sub-type identifier of said Display Port PDU comprises an EtherType-SubType identifier.

13. A method for transferring data in a data communication system, the method comprising:
    encapsulating at least one of auxiliary data or compressed video data within a Display Port protocol data unit (PDU), wherein said Display Port PDU comprises an identifier that identifies whether said auxiliary data is encapsulated within said Display Port PDU;
    encapsulating said Display Port PDU within a networking or transport protocol;
    determining an audio visual (AV) bridging specification traffic class designation associated with said networking or transport protocol based on said identifier that identifies whether said auxiliary data is encapsulated with said Display Port PDU; and
    transmitting said networking or transport protocol via a network based on said AV bridging specification traffic class designation,
    wherein the auxiliary data is transmitted to a multimedia monitor without extracting the auxiliary data from the Display Port PDU.

14. The method according to claim 13, comprising setting a data type identifier of said networking or transport protocol based on whether said Display Port PDU is encapsulated within said networking or transport protocol.

15. The method according to claim 14, wherein said data type identifier of said networking or transport protocol comprises an EtherType identifier.

16. The method according to claim 13, wherein said identifier that identifies whether said auxiliary data is encapsulated within said Display Port PDU further identifies whether said compressed video data is encapsulated within said Display Port PDU.

17. The method according to claim 14, wherein said data type identifier of said Display Port PDU-comprises an EtherTypeSubType identifier.

18. The method according to claim 13, wherein said networking or transport protocol comprises at least one of an Ethernet frame or an Internet Protocol (IP) packet.

19. A system for transferring data in a data communication system, the system comprising:
   one or more circuits that extract a Display Port protocol data unit (PDU) encapsulated within an networking or transport protocol received at a destination device via a network, wherein said Display Port PDU-comprises an identifier that identifies whether auxiliary data or compressed video data is encapsulated within said Display Port PDU;
   one or more circuits that, when compressed video data and video data rendering instructions are encapsulated within said Display Port PDU based on said identifier, enable transmission of said Display Port PDU, without extracting the compressed video data from the Display Port PDU, to a multimedia monitor coupled to said destination device via a Display Port connector; and
   one or more circuits that, when auxiliary data is encapsulated within said Display Port PDU based on said identifier, enable transmission of said auxiliary data, without extracting the auxiliary data from the Display Port PDU, to said multimedia monitor coupled to said destination device via an auxiliary channel of said Display Port connector,
   wherein said transmission enables decompression of compressed video data contained within said Display Port PDU and rendering of resulting uncompressed video data on said multimedia monitor.

20. The system according to claim 19, wherein said networking or transport protocol comprises an address field which enables said network to deliver said networking or transport protocol to said destination device.

21. The system according to claim 20, wherein delivery of said networking or transport protocol by said network is based on a traffic class designation in accordance with an audio visual (AV) bridging specification service requirement.

22. The system according to claim 21, wherein a latency associated with said delivery of said networking or transport protocol by said network is determined based on said traffic class designation.

23. The system according to claim 19, wherein said networking or transport protocol comprises at least one of an Ethernet frame or an Internet Protocol (IP) packet including a data type identifier that identifies whether said Display Port PDU or general data is encapsulated within said networking or transport protocol.

24. The system according to claim 19, wherein said Display Port PDU comprises a mini-packet of at least one of said auxiliary data or said compressed video data, said auxiliary data comprising one or more control signals of an input or output device or of an encryption key exchange.

25. The system according to claim 19, wherein said one or more circuits extract said Display Port PDU from said networking or transport protocol based on a data type.

26. The system according to claim 25, wherein said data type is determined based on a data type identifier of said networking or transport protocol.

27. The system according to claim 26, wherein:
   said identifier that identifies whether auxiliary or compressed video data is encapsulated within said Display Port PDU comprises a data sub-type type identifier of said Display Port PDU; and
   said system comprises one or more circuits that determine whether said Display Port PDU comprises said auxiliary data within said Display Port PDU based on said data sub-type identifier of said Display Port PDU.

28. The system according to claim 27, wherein said system comprises one or more circuits that determine whether said Display Port PDU is encapsulated within said networking or transport protocol based on a data type identifier of said networking or transport protocol.

29. The system according to claim 28, wherein
   said system comprises one or more circuits that determine whether to transmit said auxiliary data to a processing unit of said auxiliary data based on said data sub-type type identifier of said Display Port PDU.

* * * * *